US010386836B2

(12) United States Patent
Lockwood et al.

(10) Patent No.: US 10,386,836 B2
(45) Date of Patent: Aug. 20, 2019

(54) INTERACTIONS BETWEEN VEHICLE AND TELEOPERATIONS SYSTEM

(71) Applicant: Zoox, Inc., Menlo Park, CA (US)

(72) Inventors: Amanda Lee Kelly Lockwood, Menlo Park, CA (US); Ravi Gogna, San Jose, CA (US); Gary Linscott, Cupertino, CA (US); Timothy Caldwell, Mountain View, CA (US); Marin Kobilarov, Moutain View, CA (US); Paul Orecchio, Cupertino, CA (US); Dan Xie, Santa Clara, CA (US); Ashutosh Gajanan Rege, San Jose, CA (US); Jesse Sol Levinson, Redwood City, CA (US)

(73) Assignee: Zoox, Inc., Foster City, CA (US)

( * ) Notice: Subject to any disclaimer, the term of this patent is extended or adjusted under 35 U.S.C. 154(b) by 161 days.

(21) Appl. No.: 15/644,267

(22) Filed: Jul. 7, 2017

(65) Prior Publication Data

US 2019/0011912 A1    Jan. 10, 2019

(51) Int. Cl.
*G05D 1/00* (2006.01)
*G05D 1/02* (2006.01)

(52) U.S. Cl.
CPC ......... *G05D 1/0044* (2013.01); *G05D 1/0214* (2013.01); *G05D 1/0231* (2013.01)

(58) Field of Classification Search
CPC .. G05D 1/0044; G05D 1/0241; G05D 1/0231; G05D 1/0291
USPC .......................................................... 701/2
See application file for complete search history.

(56) References Cited

U.S. PATENT DOCUMENTS

| 6,393,362 | B1 | 5/2002 | Burns |
| 6,442,456 | B2 | 8/2002 | Burns et al. |
| 8,849,494 | B1 | 9/2014 | Herbach et al. |
| 8,996,224 | B1 | 3/2015 | Herbach et al. |
| 9,008,890 | B1 | 4/2015 | Herbach et al. |
| 9,201,421 | B1 | 12/2015 | Fairfield et al. |

(Continued)

OTHER PUBLICATIONS

PCT Search Report and Written Opinion dated Sep. 18, 2018, for PCT Application No. PCT/US2018/040599, 14 pages.

(Continued)

*Primary Examiner* — Marthe Y Marc-Coleman
(74) *Attorney, Agent, or Firm* — Lee & Hayes, P.C.

(57) ABSTRACT

A method for operating a driverless vehicle may include receiving, at the driverless vehicle, sensor signals related to operation of the driverless vehicle, and road network data from a road network data store. The method may also include determining a driving corridor within which the driverless vehicle travels according to a trajectory, and causing the driverless vehicle to traverse a road network autonomously according to a path from a first geographic location to a second geographic location. The method may also include determining that an event associated with the path has occurred, and sending communication signals to a teleoperations system including a request for guidance and one or more of sensor data and the road network data. The method may include receiving, at the driverless vehicle, teleoperations signals from the teleoperations system, such that the vehicle controller determines a revised trajectory based at least in part on the teleoperations signals.

20 Claims, 22 Drawing Sheets

(56) References Cited

U.S. PATENT DOCUMENTS

| | | |
|---|---|---|
| 9,248,834 B1 | 2/2016 | Ferguson et al. |
| 9,280,156 B1 | 3/2016 | Ferguson et al. |
| 9,465,388 B1 | 10/2016 | Fairfield et al. |
| 9,541,410 B1 | 1/2017 | Herbach et al. |
| 9,547,989 B2 | 1/2017 | Fairfield et al. |
| 9,563,199 B1 | 2/2017 | Ferguson et al. |
| 9,734,455 B2 * | 8/2017 | Levinson ............ G05D 1/0088 |
| 10,048,683 B2 * | 8/2018 | Levinson ............ G01S 7/4972 |
| 2015/0248131 A1 | 9/2015 | Fairfield et al. |
| 2017/0123419 A1 | 5/2017 | Levinson et al. |
| 2019/0011910 A1 | 1/2019 | Lockwood et al. |

OTHER PUBLICATIONS

Office Action dated Apr. 11, 2019 for U.S. Appl. No. 15/644,310, Lockwood et al, "Interactions Between Vehicle and Teleoperations System", 20 pages.

\* cited by examiner

INTERACTIONS BETWEEN VEHICLE AND TELEOPERATIONS SYSTEM

BACKGROUND

Vehicles may be used to transport people between different places. Normal driving procedures may include maneuvering the vehicle within the confines of a lane, maneuvering around turns in the road, and safely passing through intersections, as well as complying with traffic laws. However, during transit on a road along a route between two places, a vehicle may encounter an event that interrupts normal driving procedures, such as events that are either unpredictable in nature, pose safety concerns, or require responses to spontaneous visual cues or direction, such as hand signals provided by a police officer or a construction worker directing traffic. In some instances, due to the nature of the events and the potential for adverse impact on travel time, avoiding such events may be desirable.

BRIEF DESCRIPTION OF THE DRAWINGS

The detailed description is described with reference to the accompanying figures. In the figures, the left-most digit(s) of a reference number identify the figure in which the reference number first appears. The same reference numbers in different figures indicate similar or identical items.

DETAILED DESCRIPTION

Figure 1:
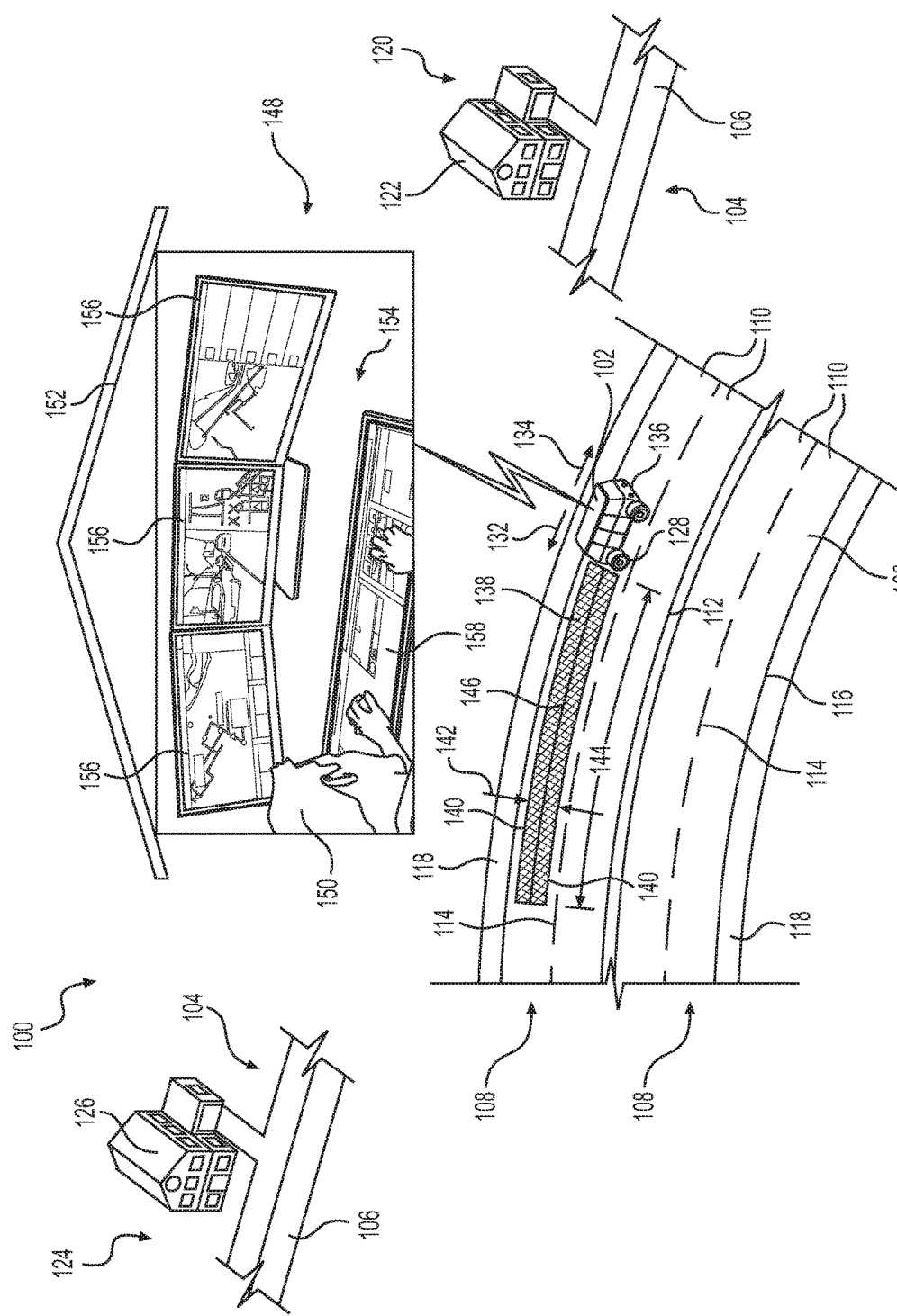
FIG. 1 is a schematic diagram of an example environment through which an example vehicle travels along a road of a road network.

A vehicle traveling on a road of a road network according to a route from first location to a destination at a second location may encounter events along the route that are unpredictable in nature, pose safety concerns, or require responses to spontaneous visual cues or direction from, for example, police officers or construction workers. In such circumstances, a driverless vehicle autonomously traveling along the route and encountering such events may reduce its travel speed or come to a stop due to, for example, potential safety concerns related to the event or a lack of sufficient information to continue traveling along the route.

This disclosure is generally directed to facilitating interaction between a vehicle, such as a driverless vehicle, and a remotely located teleoperations system. In some examples, the vehicle may be a bi-directional vehicle and may operate generally with equal performance characteristics in all directions, for example, such that a first end of the vehicle is a front end of the vehicle when travelling in a first direction, and such that the first end becomes a rear end of the vehicle when traveling in the opposite, second direction. In some examples, the teleoperations system may provide guidance and information to a driverless vehicle when the driverless vehicle encounters an event, so that the driverless vehicle will be able to avoid, maneuver around, and/or pass through the area associated with the event. The driverless vehicle may be configured to send communication signals to the remotely located teleoperations system, and based at least in part on the communication signals, the teleoperations system may provide the driverless vehicle with guidance, including instructions, proposed actions or maneuvers for the evaluation and/or execution by the driverless vehicle, and/or information to assist the driverless vehicle past the area associated with the event. In some examples, the driverless vehicle and the teleoperations system may be configured to collaborate with one another, so that the driverless vehicle will be able to overcome the event. For example, upon encountering an event the driverless vehicle may request guidance. Rather than simply instructing the driverless vehicle how to navigate the event, the teleoperations system may provide guidance related to the request, and the driverless vehicle may determine a course of operation to overcome the event based at least in part on the guidance. In some examples, the driverless vehicle may send a proposed maneuver and/or action to the teleoperator and, based at least in part on the proposal, the teleoperator may confirm or reject the proposal.

In some examples, a method for operating a driverless vehicle including a vehicle controller may include receiving, at the driverless vehicle, sensor signals including sensor data from one or more sensors associated with the driverless vehicle, wherein the sensor data is related to operation of the driverless vehicle. The method may also include receiving road network data from a road network data store, the road network data being based at least in part on a location of the driverless vehicle. The method may further include determining, at the driverless vehicle, a driving corridor within which the driverless vehicle travels according to a trajectory. The driving corridor may include virtual boundaries and may be based at least in part on the sensor data and/or the road network data. The method may also include causing the driverless vehicle to traverse a road network autonomously according to a path from a first geographic location to a second geographic location different than the first geographic location. The method may also include determining that an event associated with the path has occurred, and sending communication signals from the driverless vehicle to a teleoperations system. The communication signals may include a request for guidance from the teleoperations system and the sensor data, the road network data, or both, though any data and/or output from one or more modules of the vehicle systems is contemplated. The method may also include receiving, at the driverless vehicle, teleoperations signals from the teleoperations system. For example, the teleoperations signals may include guidance to alter the virtual boundaries of the driving corridor, such that the vehicle controller determines a revised trajectory. For example, the alteration is configured to result in avoiding the event, traveling around the event, or passing through the event. In some examples, the teleoperations signals may provide guidance to cause the vehicle controller to alter the virtual boundaries a minimal amount that still allows the driverless vehicle to traverse the event.

In some examples, the driverless vehicle may traverse the road network autonomously by generating, at the driverless vehicle, a plurality of revised trajectories concurrently or substantially simultaneously (within technical capabilities) based at least in part on the altered virtual boundaries of the driving corridor. In some examples, each of the revised trajectories may be associated with a confidence level, and the method may further include selecting a revised trajectory having a highest confidence level from among the plurality of revised trajectories, and operating the driverless vehicle according to the selected revised trajectory. Confidence levels may be based at least in part on a probability that the vehicle can traverse a portion of the path. For example, confidence levels may be associated with a probability that using a particular trajectory will result in the driverless vehicle being able to successfully maneuver past a portion of the path associated with the event.

In some examples, an event may be identified in relation to a confidence level associated with a probability of the driverless vehicle being able to successfully maneuver past a portion of the path between the first geographic location and the second geographic location. For example, if the confidence level is below a threshold confidence level, it may be an indication of the occurrence of an event that may result in initiation of transmission of communication signals from the driverless vehicle to the teleoperations system including a request for guidance. In some examples, the request may be inferred and/or determined by the teleoperations system based at least in part on, for example, the sensor data and/or other information associated with the driverless vehicle. In some examples, determining that an event has occurred may include determining that a confidence level associated with a trajectory according to which the vehicle is operating at a location along the path is less than a threshold confidence level.

For example, an event may include one or more of an activity associated with a portion of the path, an object along the path at least partially within the driving corridor as the vehicle approaches the object (e.g., people, animals, vehicles, or other static or dynamic objects) along the path at least partially within the driving corridor or moving with a trajectory toward the driving corridor as the vehicle approaches the object. In some examples, the event may be indicative of a predicted movement of an object into the driving corridor, resulting in a confidence level dropping below the threshold confidence level. In some examples, identifying an event may include determining a classification of an object present in the driving corridor and/or predicting movement of an object having a trajectory toward the driving corridor. In such events, the confidence level associated with the vehicle successfully passing the event according to its trajectory at the location associated with the event may be below a threshold confidence level. Such circumstances may result in initiation of transmission of communication signals from the driverless vehicle including a request for guidance from the teleoperations system.

This disclosure is also generally directed to a teleoperations system for assisting with operating a driverless vehicle. The driverless vehicle may include a vehicle controller and may be configured to autonomously operate according to a first operating mode associated with first operating parameters via the vehicle controller along a road network according to a path from a first geographic location to a destination separated from the first geographic location. The teleoperations system may include a teleoperations receiver configured to receive sensor data associated with sensor signals received from one more sensors associated with the driverless vehicle. The sensor data may be related to operation of the driverless vehicle. The teleoperations system may also include a teleoperations interface configured to facilitate determining that the driverless vehicle is in a second geographic area based at least in part on the sensor data associated with sensor signals received from one or more sensors associated with the driverless vehicle. The teleoperations interface may also be configured to facilitate classifying the second geographic area as corresponding to a zone in which the vehicle controller is to operate the driverless vehicle according to a second operating mode associated with second operating parameters. One or more of the second operating parameters may differ from a corresponding first operating parameter. The teleoperations system may also include a teleoperations transmitter configured to send teleoperations signals to the driverless vehicle. The teleoperations signals may provide guidance to the vehicle controller to switch from the first operating mode to the second operating mode while operating in the second geographic area.

This disclosure is also generally directed to a method for operating a driverless vehicle including a vehicle controller, and autonomously operating the driverless vehicle according to a first operating mode associated with first operating parameters via the vehicle controller along a road network according to a path from a first geographic location to a destination separated from the first geographic location. The method may include receiving, via a teleoperations receiver located remotely from the driverless vehicle, via another entity, and/or via the driverless vehicle, communication signals indicating occurrence of an event associated with a second geographic area located along the path. The method may additionally or alternatively include reviewing, by a teleoperator in communication with the teleoperations receiver, sensor data associated with sensor signals received from one more sensors associated with the driverless vehicle. In some examples, the sensor data may be related to operation of the driverless vehicle. The method may also include classifying, via the other entity and/or the teleoperator, the second geographic area as corresponding to a zone in which the vehicle controller operates the driverless vehicle according to a second operating mode associated with second operating parameters. In some examples, at least one of the second operating parameters may differ from a corresponding first operating parameter. The method may further include sending teleoperations signals, via a teleoperations transmitter, to the driverless vehicle. In some examples, the teleoperations signals may provide guidance to the vehicle controller to switch from the first operating mode to the second operating mode while operating in the second geographic area. In some examples, the teleoperations signals may provide guidance representative of virtual boundaries of the second geographic area. The second operating parameters may include one or more of second performance parameters, second vehicle operation policies, second vehicle operation laws, and second vehicle operation regulations. In some examples, the second geographic area may correspond to one or more of a construction zone, a school zone, a flood zone, an accident zone, a parade zone, a special event zone, and a zone associated with a slow traffic condition. In some examples, the teleoperations signals may provide guidance including one or more of causing the driverless vehicle to at least one of ignore the event, increase or decrease probabilities of classes of objects (e.g., in a school zone, increase a probability that a small object is a child), alter virtual boundaries of a driving corridor within which the vehicle operates, and operate the driverless vehicle according to a travel speed constraint (e.g., reducing a maximum travel speed). Some examples of the method may include sending teleoperations signals to a plurality of driverless vehicles. In some examples, the teleoperations signals may include guidance to operate at least some of the plurality of driverless vehicles in the second geographic area according the second operating mode.

This disclosure is also generally directed to a computer-readable storage medium having computer-executable instructions stored thereupon which, when executed by a computer, cause the computer to assist with operating at least a subset of a plurality of driverless vehicles of a fleet of driverless vehicles. Each driverless vehicle of the subset may include a vehicle controller and may autonomously operate according to a first operating mode associated with first operating parameters via the vehicle controller along a road network according to a respective path from a respective first geographic location to a respective destination separated from the first geographic location. Assisting with operating the at least a subset of the plurality of vehicles may cause the computer to send teleoperations signals to each driverless vehicle of the subset. The teleoperations signals may provide guidance to the respective vehicle controllers to switch from the first operating mode to a second operating mode. The second operating mode may be associated with second operating parameters including one or more of second performance parameters, second vehicle operation policies, second vehicle operation laws, or second vehicle operation regulations. At least one of the second operating parameters may differ from a corresponding first operating parameter.

This disclosure is also generally directed to a method for altering operation of at least a subset of a plurality of driverless vehicles of a fleet of driverless vehicles. Each driverless vehicle of the subset may include a vehicle controller and may autonomously operate according to a first operating mode associated with first operating parameters via the vehicle controller along a road network according to a respective path from a respective first geographic location to a respective destination separated from the first geographic location. The method may include sending teleoperations signals, via a teleoperations transmitter in communication with a teleoperator and located remotely from the driverless vehicles, to each driverless vehicle of the subset. The teleoperations signals may provide guidance to the respective vehicle controllers to switch from the first operating mode to a second operating mode. The second operating mode may be associated with second operating parameters including one or more of second performance parameters, second vehicle operation policies, second vehicle operation laws, and second vehicle operation regulations. At least one of the second operating parameters may differ from a corresponding first operating parameter. In some examples, the guidance may include switching from the first operating mode to the second operating mode for a predetermined period of time and thereafter returning to the first operating mode.

The second operating parameters may include one or more of reducing energy expenditure of the driverless vehicles, setting a maximum operating speed, preventing the driverless vehicles from operating bidirectionally, changing a threshold confidence level required for autonomous operation, changing a threshold confidence level required for autonomous operation in a second geographic area, altering at least one of an object classification model or an object prediction model used by the driverless vehicles, or relaxing vehicle operation policies associated with complying with traffic laws and regulations.

In some examples, such teleoperations signals may also include commands to actuate one or more systems or subsystems of at least a portion of the driverless vehicles in a fleet of driverless vehicles. As a non-limiting example, a second operating mode may be associated with turning on headlights, turning off interior lighting, controlling a volume of audio signals, relaying audio and/or visual light patterns to an interior or exterior of each driverless vehicle, turning on or off one or more sensors (e.g., LIDAR, RADAR, cameras, IMUs, etc.), or the like.

In some examples, the teleoperations signals to each driverless vehicle of the subset may include guidance to the respective vehicle controllers to avoid a second geographic area based at least in part on a presence of an event associated with the road network. For example, the second geographic area may correspond to one or more of a construction zone, a school zone, a flood zone, an accident zone, a parade zone, a special event zone, or a zone associated with a slow traffic condition. In such examples, operating each of the driverless vehicles of the subset via the respective vehicle controllers may include operating each of the driverless vehicles according to a second operating mode that corresponds to at least one of the zones. In some examples, the guidance may include switching from the first operating mode to the second operating mode while operating in a second geographic area.

The subset of driverless vehicles may include one or more of driverless vehicles carrying at least one occupant, driverless vehicles having no occupants, driverless vehicles including at least one battery having a charge below a threshold level of charge, and driverless vehicles configured to determine a status of conditions associated with the road network. Vehicles having one or more of these different example characteristics may be operated differently to account for, or take advantage of, the one or more characteristics. For example, a vehicle having a relatively low battery charge but no occupants, may take a path having a shorter distance between a starting point and a destination to reduce battery use, even though a traffic condition along the shorter path may result in a trip having a longer duration, which might be less desirable if the vehicle is occupied.

In some examples, the method may include receiving, via a teleoperations receiver located remotely from the driverless vehicles, communication signals from at least one of the driverless vehicles of the subset indicating occurrence of an event. The communication signals indicating occurrence of the event may include communication signals indicative of a classification of an object present in the driving corridor or moving with a trajectory toward the driving corridor. In some such examples, sending teleoperations signals providing guidance to the vehicle controller to switch from the first operating mode to the second operating mode may include sending teleoperations signals providing guidance to at least one of alter the classification of the object or ignore the object.

This disclosure is also generally directed to a teleoperations system for assisting with operating a driverless vehicle. The driverless vehicle may include a vehicle controller and may be configured to autonomously operate via the vehicle controller along a road network according to a path from a first geographic location to a destination separated from the first geographic location. The teleoperations system may include a teleoperations receiver configured to receive communication signals from the driverless vehicle. The communication signals may include at least a portion of sensor data from one or more sensors associated with the driverless vehicle. The at least a portion of sensor data may be related to operation of the driverless vehicle. The communication signals may also include data indicating occurrence of an event associated with the path. The data indicating occurrence of the event may include data indicating a confidence level associated with the path is less than a threshold confidence level. The teleoperations system may further include a teleoperations interface configured to facilitate reviewing the at least a portion of sensor data and the data indicating occurrence of the event, and determining a level of guidance to provide the driverless vehicle based at least in part on at least one of the at least a portion of sensor data or the data indicating occurrence of the event. The teleoperations system may also include a teleoperations transmitter configured to transmit teleoperations signals to the driverless vehicle. The teleoperations signals may include guidance to operate the driverless vehicle according to the determined level of guidance. The driverless vehicle may be configured to maneuver via the vehicle controller to at least one of avoid the event, travel around the event, or pass through the event based at least in part on the teleoperations signals.

The techniques and systems described herein may be implemented in a number of ways. Example implementations are provided below with reference to the figures.

FIG. 1 is a schematic diagram of an example environment 100 through which an example vehicle 102 travels. The example environment 100 includes a road network 104 including a plurality of example roads 106 having two pairs 108 of lanes 110 separated by a median or double-yellow line 112, with each of the lanes 110 of a pair 108 of lanes 110 defined by a lane dividing line 114 and lane boundary lines 116. The example road 106 also includes shoulders 118 located on opposite sides of the road 106. FIG. 1 also shows an example geographic location 120 associated with a departure location including a structure 122, such as a house or building, and an example destination 124 also including a structure 126, such as a house or building. The road network 104 provides a number of roads 106 defining a path between the geographic location 120 and the destination 124, and FIG. 1 shows an enlarged view of a portion of an example road 106. The road network 104 may include a number of features, such as curves, intersections with crossroads, crosswalks, traffic signs, traffic lights, railroad crossings, traffic circles, directional arrows, etc.

As shown in FIG. 1, the example vehicle 102 may travel through the example environment 100 via the road network 104 according to a path from the geographic location 120 to the destination 124. For the purpose of illustration, the vehicle 102 may be a driverless vehicle, such as an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. In that case, since the vehicle 102 may be configured to control all functions from start to completion of the trip, including all parking functions, it may not include a driver. This is merely an example, and the systems and methods described herein may be incorporated into any ground-borne, airborne, or waterborne vehicle, including those ranging from vehicles that need to be manually controlled by a driver at all times, to those that are partially or fully autonomously controlled.

The example vehicle 102 shown in FIG. 1 is an automobile having four wheels 128 and respective tires for each of the wheels 128. Other types and configurations of vehicles are contemplated, such as, for example, vans, sport utility vehicles, cross-over vehicles, trucks, buses, agricultural vehicles, and construction vehicles. The vehicle 102 may be powered by one or more internal combustion engines, one or more electric motors, hydrogen power, any combination thereof, and/or any other suitable power sources. In addition, although the example vehicle 102 has four wheels 128, the systems and methods described herein may be incorporated into vehicles having fewer or a greater number of wheels, tires, and/or tracks. The example vehicle 102 has four-wheel steering and may operate generally with equal performance characteristics in all directions, for example, such that a first end 130 of the vehicle 102 is a front end of the vehicle 102 when travelling in a first direction 132, and such that the first end 130 becomes the rear end of the vehicle 102 when traveling in the opposite, second direction 134, as shown in FIG. 1. Similarly, a second end 136 of the vehicle 102 is a front end of the vehicle 102 when travelling in the second direction 134, and such that the second end 136 becomes the rear end of the vehicle 102 when traveling in the opposite, first direction 132. Such a configuration may be referred to herein as "bidirectionality." These example bidirectional characteristics may facilitate greater maneuverability, for example, in small spaces or crowded environments, such as parking lots and urban areas.

In the example shown in FIG. 1, the vehicle 102 may use various sensors and a vehicle controller to autonomously operate through the environment 100 along the path via the road network 104, as explained in more detail herein. For example, the vehicle controller may be configured to determine a driving corridor 138 defined by virtual boundaries 140 within which the vehicle 102 may travel. For example, the driving corridor 138 may have a variable corridor width 142 in the width direction of the vehicle 102, and a variable corridor length 144 extending in the direction of travel of the vehicle 102. In some examples, the virtual boundaries 140 of the driving corridor 138 may be determined based at least in part on sensor data received from sensors associated with the vehicle 102 and/or road network data received by the vehicle 102 via a road network data store, as explained in more detail herein. Though not illustrated in FIG. 1, such sensor data indicative of objects may be represented in such a corridor as indented or removed portions. In some examples, the vehicle 102 may travel along a drive line 146 within the driving corridor 138.

In some examples, the vehicle 102 may operate autonomously until the vehicle 102 encounters an event along the road 106 for which it may request assistance from, for example, a teleoperations system 148 located remotely from the vehicle 102. For example, the vehicle 102 may encounter a construction zone associated with a portion of the path, and traffic in the vicinity of the construction zone may be under the direction of a construction worker who provides instructions for traffic to maneuver around the construction zone. Due in part to the unpredictable nature of this type of event, the vehicle 102 may request remote assistance from the teleoperations system 148. In some examples, the vehicle 102 may be a part of a fleet of vehicles in communication via a communications network with the teleoperations system 148, as explained in more detail herein.

In some examples, for example as shown in FIG. 1, the teleoperations system 148 may include one or more teleoperators 150, which may be human teleoperators located at a teleoperations center 152. In some examples, one or more of the teleoperators 150 may not be human. For example, they may be computer systems leveraging artificial intelligence, machine learning, and/or other decision making strategies. In the example shown, the teleoperator 150 may interact with one or more vehicles 102 in the fleet of vehicles via a teleoperator interface 154. The teleoperator interface 154 may include one or more displays 156 configured to provide the teleoperator 150 with data related to operation of the vehicle 102, a subset of the fleet of vehicles, and/or the fleet of vehicles. For example, the display(s) 156 may be configured to show data related to sensor signals received from the vehicles 102, data related to the road network 104, and/or additional data or information to facilitate providing assistance to the vehicles 102. In addition, the teleoperator interface 154 may also include a teleoperator input device 158 configured to allow the teleoperator 150 to provide information to one or more of the vehicles 102, for example, in the form of teleoperations signals providing guidance to the vehicles 102. The teleoperator input device 158 may include one or more of a touch-sensitive screen, a stylus, a mouse, a dial, a keypad, and/or a gesture-input system configured to translate gestures performed by the teleoperator 150 into input commands for the teleoperator interface 154. As explained in more detail herein, the teleoperations system 148 may provide one or more of the vehicles 102 with guidance to avoid, maneuver around, or pass through events.

Figure 2:
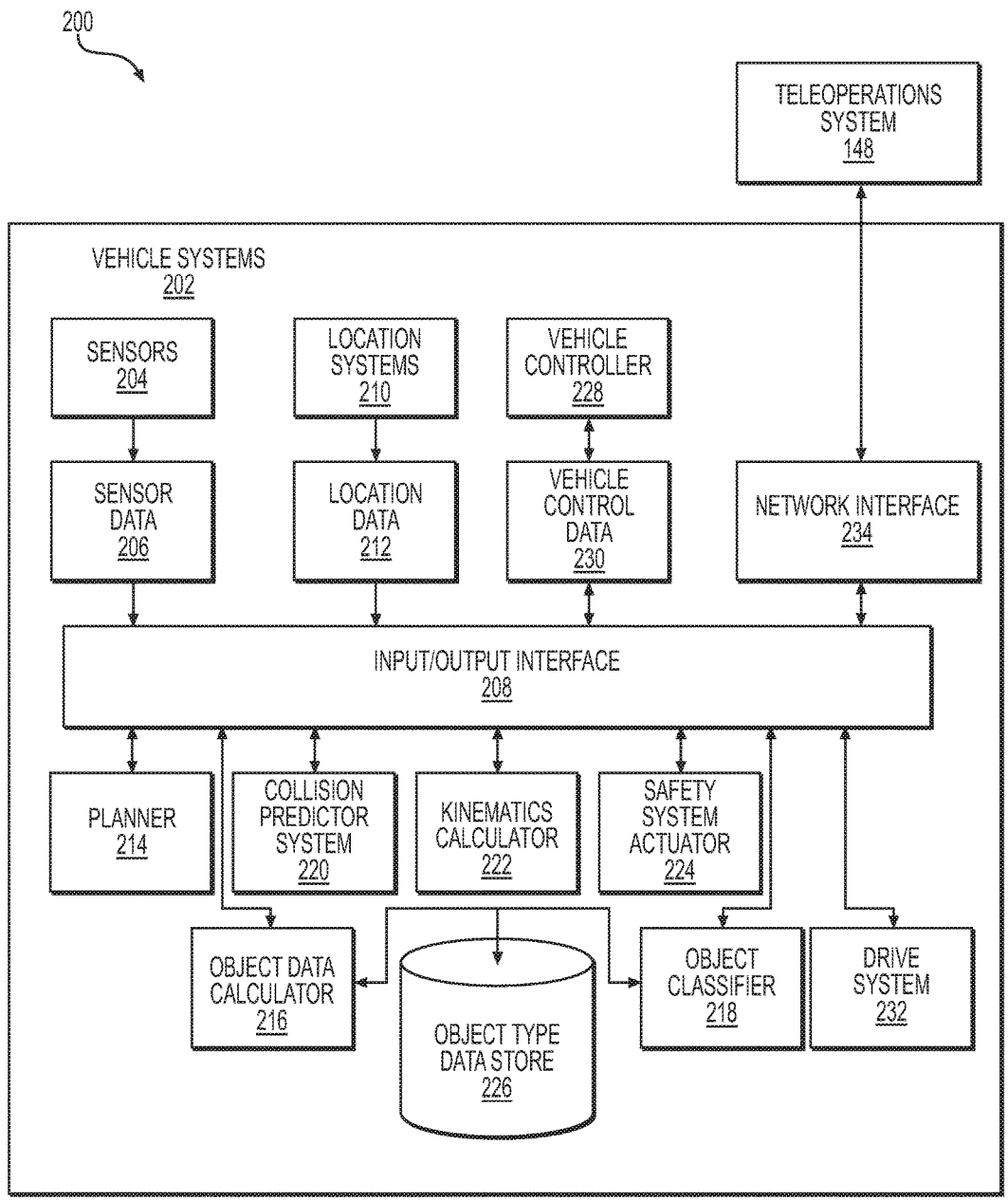
FIG. 2 is a block diagram of including example vehicle systems architecture and teleoperations system.

FIG. 2 is a block diagram of an example architecture 200 including vehicle systems 202 for controlling operation of the systems that provide data associated with operation of the vehicle 102, and that control operation of the vehicle 102.

In various implementations, the architecture 200 may be implemented using a uniprocessor system including one processor, or a multiprocessor system including several processors (e.g., two, four, eight, or another suitable number). The processor(s) may be any suitable processor capable of executing instructions. For example, in various implementations, the processor(s) may be general-purpose or embedded processors implementing any of a variety of instruction set architectures (ISAs), such as the x86, PowerPC, SPARC, or MIPS ISAs, or any other suitable ISA. In multiprocessor systems, each processor may commonly, but not necessarily, implement the same ISA. In some examples, the processor(s) may include a central processing unit (CPU), a graphics processing unit (GPU), or a combination thereof.

The example architecture 200 may include a non-transitory computer readable media configured to store executable instructions/modules, data, and/or data items accessible by the processor(s). In various implementations, the non-transitory computer readable media may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions, such as those described above, are shown stored within the non-transitory computer readable memory. In other implementations, program instructions, and/or data may be received, sent, or stored on different types of computer-accessible media, such as non-transitory media, or on similar media separate from the non-transitory computer readable media. Generally speaking, a non-transitory, computer readable memory may include storage media or memory media, such as flash memory (e.g., solid state memory), magnetic or optical media (e.g., a disk) coupled to the architecture 200 via an I/O interface. Program instructions and data stored via a non-transitory computer readable medium may be transmitted by transmission media or signals such as electrical, electromagnetic, or digital signals, which may be conveyed via a communication medium such as a network and/or a wireless link, such as may be implemented via a network interface.

In some implementations, the I/O interface may be configured to coordinate I/O traffic between the processor(s), the non-transitory computer readable media, and any peripheral devices, the network interface, or other peripheral interfaces, such as input/output devices. In some implementations, the I/O interface may perform any necessary protocol, timing, or other data transformations to convert data signals from one component (e.g., the non-transitory computer readable media) into a format suitable for use by another component (e.g., processor(s)). In some implementations, the I/O interface may include support for devices attached through various types of peripheral buses, such as a variant of the Peripheral Component Interconnect (PCI) bus standard or the Universal Serial Bus (USB) standard, for example. In some implementations, the function of the I/O interface may be split into two or more separate components, such as a north bridge and a south bridge, for example. Also, in some implementations, some or all of the functionality of the I/O interface, such as an interface to the non-transitory computer readable media, may be incorporated directly into the processor(s).

In the example architecture 200 shown in FIG. 2, the example vehicle systems 202 include a plurality of sensors 204, for example, configured to sense movement of the vehicle 102 through the environment 100, sense environmental data, such as the ambient temperature, pressure, and humidity, and/or sense objects in the environment 100 surrounding the vehicle 102. In some examples, the sensors 204 may include sensors configured to identify a location on a map. The sensors 204 may include, for example, one or more light detection and ranging sensors (LIDAR), one or more cameras (e.g., RGB-cameras, intensity (grey scale) cameras, infrared cameras, depth cameras, stereo cameras, and the like), one or more radio detection and ranging sensors (RADAR), one or more sound navigation and ranging sensors (SONAR), one or more microphones for sensing sounds in the environment 100, such as sirens from law enforcement and emergency vehicles, and other sensors related to the operation of the vehicle 102. Other sensors may include a speed sensor, sensors related to operation of internal combustion engines and/or electric motors, sensors related to the tires to detect tire temperature, tire pressure, and tread depth, and/or brake-related sensors for detecting brake temperatures and/or wear, and in vehicles having regenerative braking, sensors for detecting parameters related to operation of the regenerative braking system. The sensors 204 may also include, for example, inertial measurement units (IMUs), accelerometers, and gyroscopes. The sensors 204 may be configured to provide sensor data 206 representative of the sensed objects and signals to the vehicle systems 202 via, for example, an input/output (I/O) interface 208. Other types of sensors and sensor data are contemplated.

The example vehicle systems 202 also include location systems 210 configured to receive location information, including position and orientation data (e.g., a local position or local pose) from the sensors 204 and/or external sources, and provide location data 212 to other portions of the vehicle systems 202 via the I/O interface 208. The external sources may include global satellites for facilitating operation of a global positioning system (GPS) and/or a wireless network for communicating and receiving information related to the vehicle's location, such as map data. The location systems 210 may also include sensors configured to assist with navigation of the vehicle 102, such as wheel encoders for sensing the rotation of the wheels 128, inertial navigation sensors, such as gyroscopes and/or accelerometers, magnetometers, and/or cameras for obtaining image data for visual odometry or visio-inertial navigation.

The example vehicle systems 202 also include one or more of a planner 214, an object data calculator 216, an object classifier 218, a collision predictor system 220, a kinematics calculator 222, and a safety system actuator 224. The vehicle systems 202 may be configured to access one or more data stores including, but not limited to, an object type data store 226. The object type data store 226 may include data representing object types associated with object classifications for objects detected in the environment 100.

The example vehicle systems 202 shown in FIG. 2 also include a vehicle controller 228 configured to receive vehicle control data 230, and based on the vehicle control data 230, communicate with a drive system 232 (e.g., a steering system, a propulsion system, suspension system, and/or a braking system) to control operation of the vehicle 102. For example, the vehicle control data 230 may be derived from data received from one of more of the sensors 204 and one or more of the planner 214, the object data calculator 216, the object classifier 218, the collision predictor system 220, the kinematics calculator 222, and the safety system actuator 224, and control operation of the drive system 232, so that operation and maneuvering of the vehicle 102 is executed.

In some examples, the planner 214 may be configured to generate data representative of a trajectory of the vehicle 102, for example, using data representing a location of the vehicle 102 in the environment 100 and other data, such as local pose data, that may be included in the location data 212. In some examples, the planner 214 may also be configured to determine projected trajectories predicted to be executed by the vehicle 102. The planner 214 may, in some examples, be configured to calculate data associated with a predicted motion of an object in the environment 100, and may determine a predicted object path associated with the predicted motion of the object. In some examples, the object path may include the predicted object path. In some examples, the object path may include a predicted object trajectory. In some examples, the planner 214 may be configured to predict more than a single predicted object trajectory. For example, the planner 214 may be configured to predict multiple object trajectories based on, for example, probabilistic determinations or multi-modal distributions of predicted positions, trajectories, and/or velocities associated with an object.

In some examples, the object data calculator 216 may be configured to provide data representative of, for example, one or more of the pose (e.g., position and orientation) of an object in the environment 100 surrounding the vehicle 102, an object track associated with the object (e.g., a historic position, velocity, acceleration, and/or heading of the object over a period of time (e.g., 5 seconds)), and an object classification associated with the object (e.g., a pedestrian, a vehicle, a bicyclist, etc.). For example, the object data calculator 216 may be configured to receive data in the form of sensor signals received from one or more of the sensors 204 and determine data representing one or more of the position and/or orientation in the environment 100 of the object, the object track, and the object classification.

In some examples, the object classifier 218 may be configured to access data from the object type data store 226, which may be configured to store data representing object types, such as, for example, a species of an object classification, a subclass of an object classification, and/or a subset of an object classification. The object classifier 218, in some examples, may be configured to analyze data representing an object track and data representing an object classification with data representing an object type, and determine an object type based at least in part on the object track and classification data. For example, a detected object having an object classification of an "automobile" may have an object type of "sedan," "coupe," "hatch-back," "sports utility vehicle," "pick-up truck," or "minivan." An object type may include additional subclasses, designations, or subsets. For example, a "sedan" that is parked may have an additional subclass designation of being "static" or "being dynamic" if moving. In some examples, such an object classifier may also determine a predicted object behavior based on one or more of a portion of the sensor data or the object type.

In some examples, the collision predictor system 220 may be configured to use the data representing the object type, the predicted object behavior, the data representing the trajectory of the object, and/or the data representing the trajectory of the vehicle 102, to predict a collision between the vehicle 102 and the object.

In some examples, the kinematics calculator 222 may be configured to determine data representing one or more scalar and/or vector quantities associated with motion of objects in the environment 100, including, but not limited to, velocity, speed, acceleration, momentum, local pose, and/or force. Data from the kinematics calculator 222 may be used to compute other data, including, but not limited to, data representing an estimated time to impact between an object and the vehicle 102, and data representing a distance between the object and the vehicle 102. In some examples, the planner 214 may use data produced by the kinematics calculator 222 to estimate predicted object data. For example, the planner 214 may use current scalar and/or vector quantities associated with object to determine a likelihood that other objects in the environment 100 (e.g., cars, motorcyclists, pedestrians, cyclists, and animals) are moving in an alert or controlled state, versus an un-alert or uncontrolled state. For example, the kinematics calculator 222 may be configured estimate the probability that other objects are moving as though they are being controlled and/or are behaving in a predictable manner, or whether they are not being controlled and/or behaving in an unpredictable manner, for example, by observing motion of the object over time and relative to other objects in the environment 100. For example, if the objects are moving erratically or without appearing to adjust to the presence or motion of other objects in the environment 100, this may be an indication that the objects are either uncontrolled or moving in an unpredictable manner. This may be inferred based on sensor data received over time that may be used to estimate or predict a future location of the object relative to a current or future trajectory of the vehicle 102.

In some examples, the safety system actuator 224 may be configured to activate one or more safety systems of the autonomous vehicle 102 when a collision is predicted by the collision predictor 220 and/or the occurrence of other safety related events, such as, for example, an emergency maneuver by the vehicle 102, such as hard braking or a sharp acceleration. The safety system actuator 224 may be configured to activate an interior safety system (e.g., including seat belt pre-tensioners and/or air bags), an exterior safety system (e.g., including warning sounds and/or warning lights), the drive system 232 configured to execute an emergency maneuver to avoid a collision, and/or any combination thereof. For example, the drive system 232 may receive data for causing a steering system of the vehicle 102 to change the travel direction of the vehicle 102, and a propulsion system of the vehicle 102 to change the speed of the vehicle 102 to alter the trajectory of vehicle 102 from an initial trajectory to a trajectory for avoiding a collision.

The vehicle systems 202 may operate according to the following example. Data representing a trajectory of the vehicle 102 in the environment 100 may be received by the vehicle controller 228. Object data associated with an object in the environment 100 surrounding the vehicle 102 may be calculated. Sensor data 206 from one or more of the sensors 204 may be used to calculate the object data. The object data may include data representing the location of the object in the environment 100, an object track associated with the object, such as whether the object is stationary or moving, and an object classification associated with the object, such as whether the object is another vehicle, a pedestrian, a cyclist, an animal, or a stationary object. In some examples, the object data calculator 216, based on the object data, may be used to determine data representing the object's location in the environment 100, data representing whether the object is moving, and data representing a classification associated with the object.

In some examples, the planner 214 may use the object data to determine a predicted path of the object in the environment, for example, based on data representing the location of the object and may process that data to generate data representing a predicted object path. Data representing the type of object may be determined based on the data representing whether the object is moving, data representing the object's classification, and/or data representing object's type. A pedestrian not in motion, a vehicle in motion, and traffic sign, a lane marker, or a fire hydrant, none of which is in motion, are examples of object types with an associated motion data.

In some examples, the collision predictor system 220 may be used to predict a collision between the vehicle 102 and an object in the environment 100 based on the object type, whether the object is moving, the trajectory of the vehicle 102, the predicted path of the object obtained from the planner 214. For example, a collision may be predicted based in part on the object type due to the object moving, the trajectory of the object being in potential conflict with the trajectory of the vehicle 102, and the object having an object classification that indicates the object is a likely collision threat. In some examples, such a collision prediction may also be based on a predicted object behavior. In some examples, each classification, or sub-classification, of objects may have a corresponding associated behavior. As a non-limiting example, a predicted behavior of a bicycle is to travel in relatively straight lines having a maximum speed.

In some examples, the safety system actuator 224 may be configured to actuate one or more portions of a safety system of the vehicle 102 when a collision is predicted. For example, the safety system actuator 224 may activate one or more of the interior safety systems, one or more of the exterior safety systems, and one or more of the components of the drive system 232 (e.g., the steering system, the propulsion system, and/or the braking system) via the vehicle controller 228. In some examples, the vehicle controller 228 may determine that the interior safety system will be activated based on some action of an object in the environment 100, and the vehicle control data 230 may include information configured to cause the vehicle controller 228 to activate one or more functions of the interior safety system, the exterior safety system, and the drive system 232.

As shown in FIG. 2, the example vehicle systems 202 also include a network interface 234 configured to provide a communication link between the vehicle 102 and the teleoperations system 148. For example, the network interface 234 may be configured to allow data to be exchanged between the vehicle 102, other devices coupled to a network, such as other computer systems, other vehicles 102 in the fleet of vehicles, and/or with the teleoperations system 148. For example, the network interface 234 may enable wireless communication between numerous vehicles and/or the teleoperations system 148. In various implementations, the network interface 234 may support communication via wireless general data networks, such as a Wi-Fi network. For example, the network interface 234 may support communication via telecommunications networks, such as, for example, cellular communication networks, satellite networks, and the like.

In various implementations, the parameter values and other data illustrated herein may be included in one or more data stores, and may be combined with other information not described or may be partitioned differently into more, fewer, or different data structures. In some implementations, data stores may be physically located in one memory or may be distributed among two or more memories.

Those skilled in the art will appreciate that the example architecture 200 is merely illustrative and is not intended to limit the scope of the present disclosure. In particular, the computing system and devices may include any combination of hardware or software that can perform the indicated functions, including computers, network devices, internet appliances, tablet computers, PDAs, wireless phones, pagers, etc. The architecture 200 may also be connected to other devices that are not illustrated, or instead may operate as a stand-alone system. In addition, the functionality provided by the illustrated components may in some implementations be combined in fewer components or distributed in additional components. Similarly, in some implementations, the functionality of some of the illustrated components may not be provided and/or other additional functionality may be available.

Those skilled in the art will also appreciate that, while various items are illustrated as being stored in memory or storage while being used, these items or portions of them may be transferred between memory and other storage devices for purposes of memory management and data integrity. Alternatively, in other implementations, some or all of the software components may execute in memory on another device and communicate with the illustrated architecture 200. Some or all of the system components or data structures may also be stored (e.g., as instructions or structured data) on a non-transitory, computer-accessible medium or a portable article to be read by an appropriate drive, various examples of which are described above. In some implementations, instructions stored on a computer-accessible medium separate from the architecture 200 may be transmitted to the architecture 200 via transmission media or signals such as electrical, electromagnetic, or digital signals, conveyed via a communication medium such as a wireless link. Various implementations may further include receiving, sending, or storing instructions and/or data implemented in accordance with the foregoing description on a computer-accessible medium. Accordingly, the techniques described herein may be practiced with other control system configurations. Additional information about the operations of the modules of the vehicle 102 is discussed below.

Figure 3:
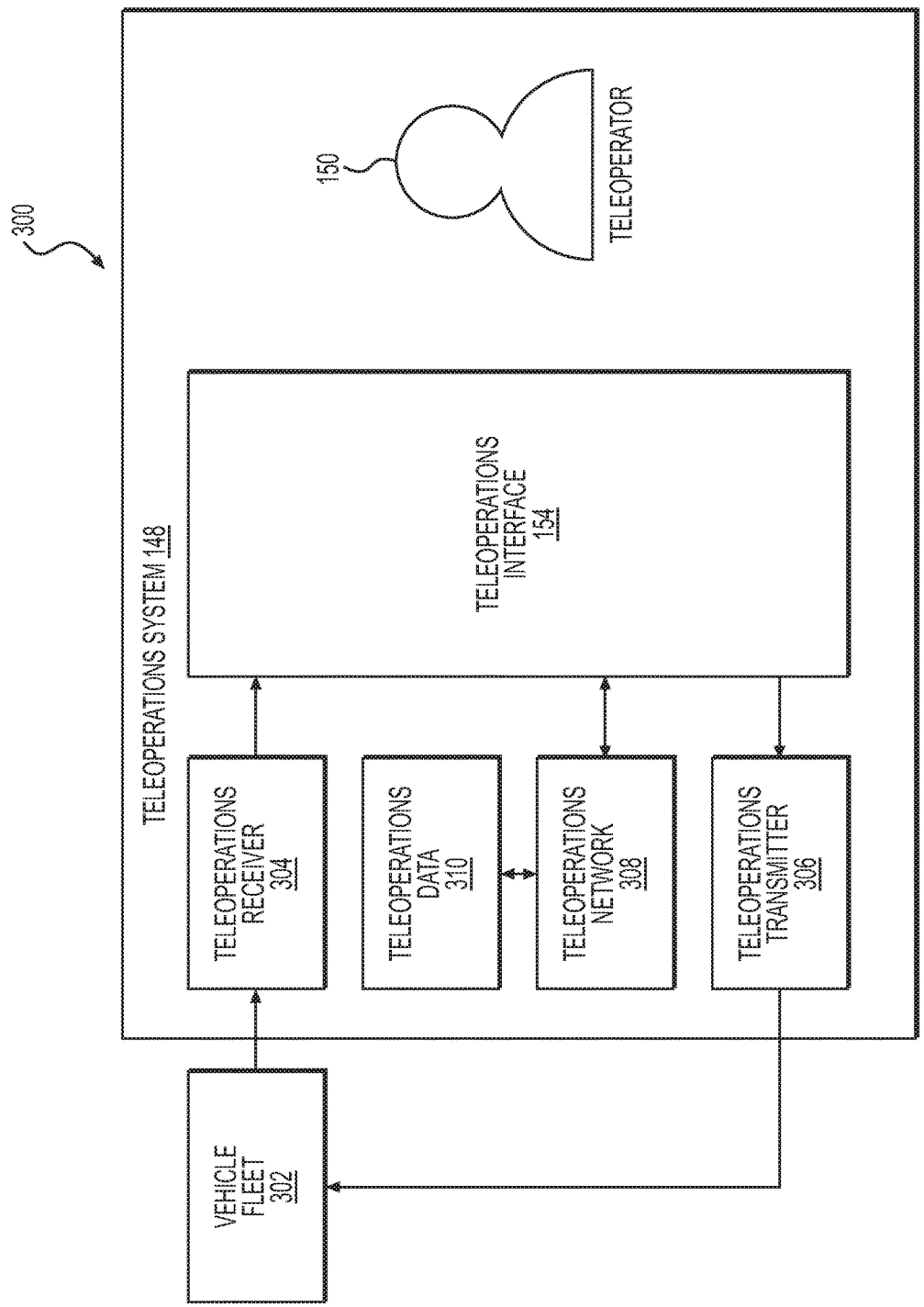
FIG. 3 is a block diagram of an example teleoperations system architecture.

FIG. 3 shows an example architecture 300 including a fleet 302 and an example teleoperations system 148. The example fleet 302 includes a plurality of vehicles 102, at least some which are communicatively coupled to the teleoperations system 148, for example, via the respective network interfaces 234 of the vehicles 102, and a teleoperations receiver 304 and a teleoperations transmitter 306 associated with the teleoperations system 148. For example, a vehicle 102 may send communication signals via the network interface 234, which are received by the teleoperations receiver 304. In some examples, the communication signals may include, for example, sensor data from sensor signals generated by one or more sensors associated with the vehicle 102, and/or road network data from a road network data store. In some examples, the sensor data may include raw sensor data or processed sensor data, and the road network data may include data related to a global or local map of an area associated with operation of the vehicle 102. In some examples, the communication signals may include data associated with the current status of the vehicle 102 and its systems, such as, for example, its current position, current speed, current path and/or trajectory, current occupancy, the level of charge of one or more of its batteries, and/or the operational status of its sensors and drive systems. In some examples, the communication signals from the vehicle 102 may include a request for information from the teleoperations system 148. Such information, may include, for example, assistance with operation of the vehicle 148 in the form of, for example, information about objects, the road network 104, the road 106, the global map, the local map, collaboration with respect to vehicle operations and maneuvers, and/or confirmation of information and/or actions proposed by the vehicle 102.

As shown in FIG. 3, the teleoperations receiver 304 may be communicatively coupled to the teleoperations interface 154, and in some examples, the teleoperator 150 may be able to access the sensor data, the road network data, and/or any other data in the communication signals received from a vehicle 102 via the teleoperations interface 154. In some examples, the teleoperator 150 may be able to selectively access the sensor data, road network data, and/or other data via the input device 158 and view the selected data via one or more of the displays 156 (see FIGS. 1 and 4). In some examples, the displays 156 may display simplistic pictorial representations, animations, bounding boxes, arrows indicating a bearing and/or velocity of objects, icons representing objects, colorization of the sensor data, and/or other representations of the data, which may simplify interpretation by a teleoperator 150.

In the example shown, the teleoperations system 148 also includes a teleoperations network 308 configured to provide communication between two or more of the teleoperations interfaces 154 and the respective teleoperators 150, and/or communication with teleoperations data 310. For example, the teleoperations system 148 may include a plurality of teleoperations interfaces 154 and respective teleoperators 150, and the teleoperators 150 may communicate with one another via the teleoperations network 308 to facilitate and/or coordinate the guidance provided to the vehicles 102 of the fleet 302. In some examples, there may be a teleoperator 150 assigned to each of the vehicles 102, and in some examples, a teleoperator 150 may be assigned to more than a single vehicle 102 of the fleet 302. In some examples, more than one teleoperator 150 may be assigned to a single vehicle 102. In some examples, teleoperators 150 may not be assigned to specific vehicles 102 of the fleet 302, but may instead provide guidance to vehicles 102 that have encountered certain types of events and/or to vehicles 102 based on, for example, a level of urgency associated with the vehicle's encounter with the event. In some examples, data associated with an event and/or the guidance provided by a teleoperator 150 may be stored by the teleoperations system 148, for example, in storage for the teleoperations data 310, and/or accessed by other teleoperators 150.

In some examples, the teleoperation data 310 may be accessible by the teleoperators 150, for example, via the teleoperations interface 154, for use in providing guidance to the vehicles 102. For example, the teleoperations data 310 may include global and/or local map data related to the road network 104, events associated with the road network 104, and/or travel conditions associated with the road network 104 due to, for example, traffic volume, weather conditions, construction zones, and/or special events. In some examples, the teleoperations data 310 may include data associated with one more of the vehicles 102 of the fleet 302, such as, for example, maintenance and service information, and/or operational history including, for example, event history associated with the vehicle 102, path histories, occupancy histories, and other types of data associated with the vehicle 102.

Figure 4:
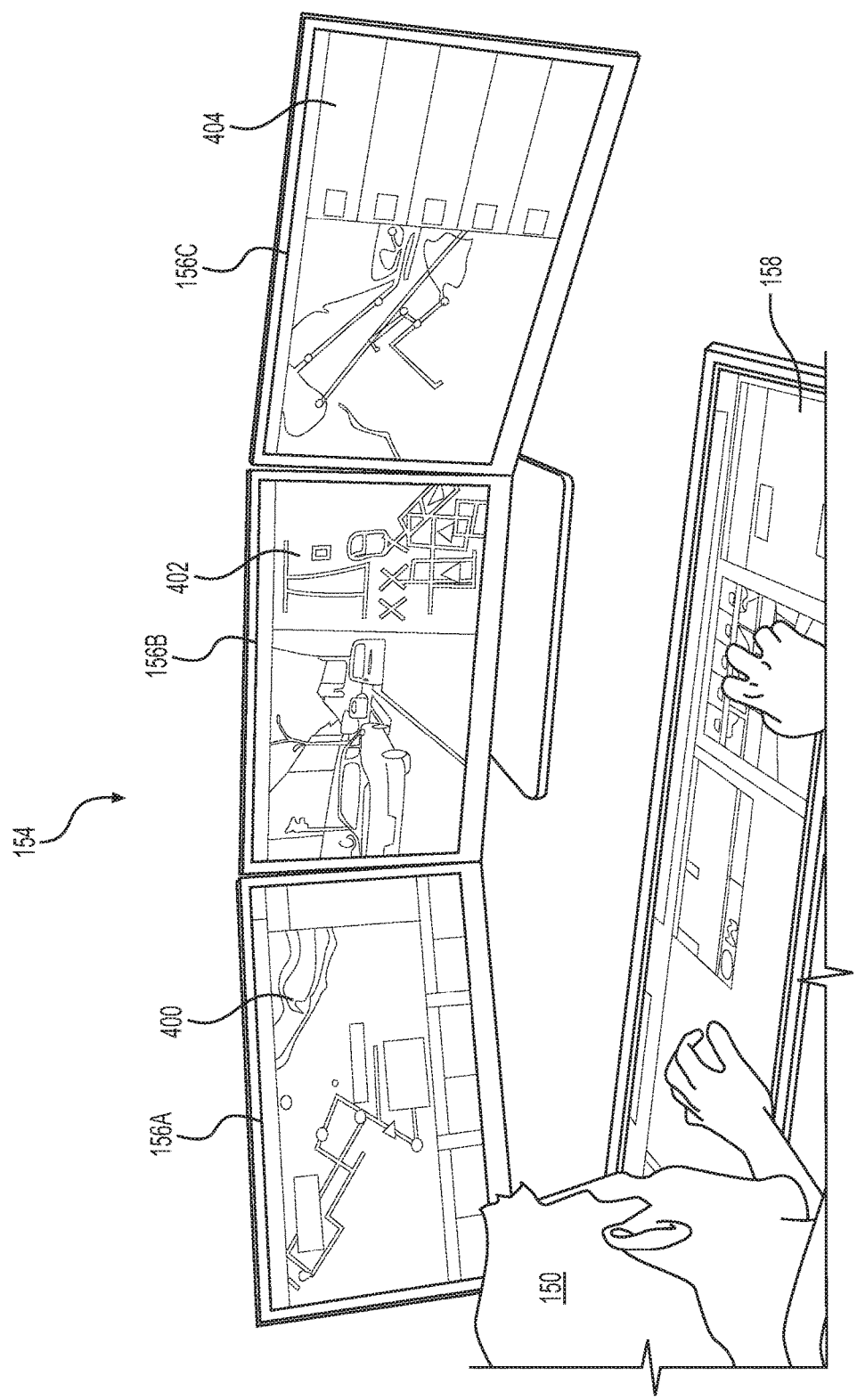
FIG. 4 is a schematic perspective view of an example teleoperations system interface.

FIG. 4 shows an example teleoperations interface 154. The example shown includes three displays 156A, 156B, and 156C configured to provide the teleoperator 150 with data related to operation of one or more vehicles 102 of the fleet 302. For example, the displays 156A, 156B, and 156C may be configured to show data related to communication signals received from the vehicles 102, data related to the road network 104, and/or additional data or information to facilitate providing assistance to the vehicles 102. In some examples, the different displays 156 may be configured to show different information related to one or more of the vehicles 102. In some examples, such content may be presented as animations or pictorial representations, colorization of sensor data, abstractions of sensor data (e.g., bounding boxes), or the like, so that information may be readily apparent regarding an event.

For example, the display 156A may be configured to show an overhead map view 400 of a geographic area in which one or more of the vehicles 102 is travelling. In some examples, the map view 400 may be supplemented with information related to the vehicle 102 and/or operational conditions in the geographic area shown in the map view 400. In some examples, the map view 400 may take the form of a split-screen view, for example, with one portion of the display 156A showing the overhead map view and another portion of the display 156A showing, for example, status-related data for a subset of the fleet 302 being monitored by the teleoperator 150 associated with the teleoperator interface 154. Other types of views are contemplated.

In some examples, the display 156B may be configured to show a situation view 402 that depicts, for example, a view from the perspective of the vehicle 102. Such as view may provide the teleoperator 150 with a relatively more intuitive view of a situation or event being experienced by the vehicle 102. In some examples, the situation view 402 may take the form of one or more of a live (real-time) video feed and a live sensor view providing a depiction of objects and surroundings sensed by the sensors of the vehicle 102. In some examples, the sensor view may provide the teleoperator 150 with information related to whether the sensors are detecting all of the relevant objects in the surroundings. In some examples, the situation view 402 may take the form of a split-screen view with one portion of the display 156B showing a live video feed and another portion of the display 156B showing a live sensor view. Other types of views and/or representations (e.g., such as those described herein) are contemplated.

The display 156C may be configured to show a fleet view 404 that depicts, for example, an overhead map view showing the locations of one or more vehicles 102 of the fleet 302 and other information related to the status of the fleet 302 and/or the geographic area shown, such as, for example, traffic-related information and/or event-related information. In some examples, the fleet view 404 may show the origins, destinations, and/or paths for one or more of the vehicles 102 of the fleet 302. In some examples, the fleet view 404 may take the form of a split-screen view, for example, with one portion of the display 156C showing the overhead map view and another portion of the display 156C showing, for example, status-related data for a subset of the fleet 302 being monitored by the teleoperator 150 associated with the teleoperator interface 154.

Although the displays 156A, 156B, and 156C are described in a manner that suggests they may be three separate displays 156, they may be integrated into a single display 156, or may include fewer or more displays 156. In some examples, the displays 156 may be reconfigurable to show different information, information in different formats, information in different arrangements, and/or information at a different level of detail. For example, the information displayed and/or the arrangement of the information displayed may be tailored by the teleoperator 150 associated with the teleoperator interface 154. In some examples, the teleoperations system 148 may be configured to automatically show the displayed information according to default settings that provide, for example, the most useful information in the most intuitive arrangement and/or level of detail based on, for example, the situation and/or status associated with a vehicle 102 for which guidance from the teleoperator 150 is most urgently needed.

In addition, the example teleoperator interface 154 shown in FIG. 4 also includes a teleoperator input device 158 configured to allow the teleoperator 150 to provide information to one or more of the vehicles 102, for example, in the form of teleoperations signals providing guidance to the vehicles 102. The teleoperator input device 158 may include one or more of a touch-sensitive screen, a stylus, a mouse, a dial, a keypad, and/or a gesture-input system configured to translate gestures performed by the teleoperator 150 into input commands for the teleoperator interface 154. In some examples, the input device 158 may include a split-screen providing different touch-sensitive areas that the teleoperator 150 may use to provide different types of information to a vehicle 102. For example, the different areas of the split-screen may provide the teleoperator 150 with different types of information and may facilitate the teleoperator's ability to provide instructions to the vehicle 102, collaborate with the vehicle 102, and/or confirm information and/or proposed actions to be executed by the vehicle 102. For example, one portion of the input device 158 may provide a menu of different vehicles 102 of the fleet 302 to facilitate the teleoperator's selection of a vehicle 102 for which to provide guidance. Other portions of the input device 158 may include interactive displays and/or options for providing guidance to a selected vehicle 102, as explained in more detail herein.

Figure 5A:
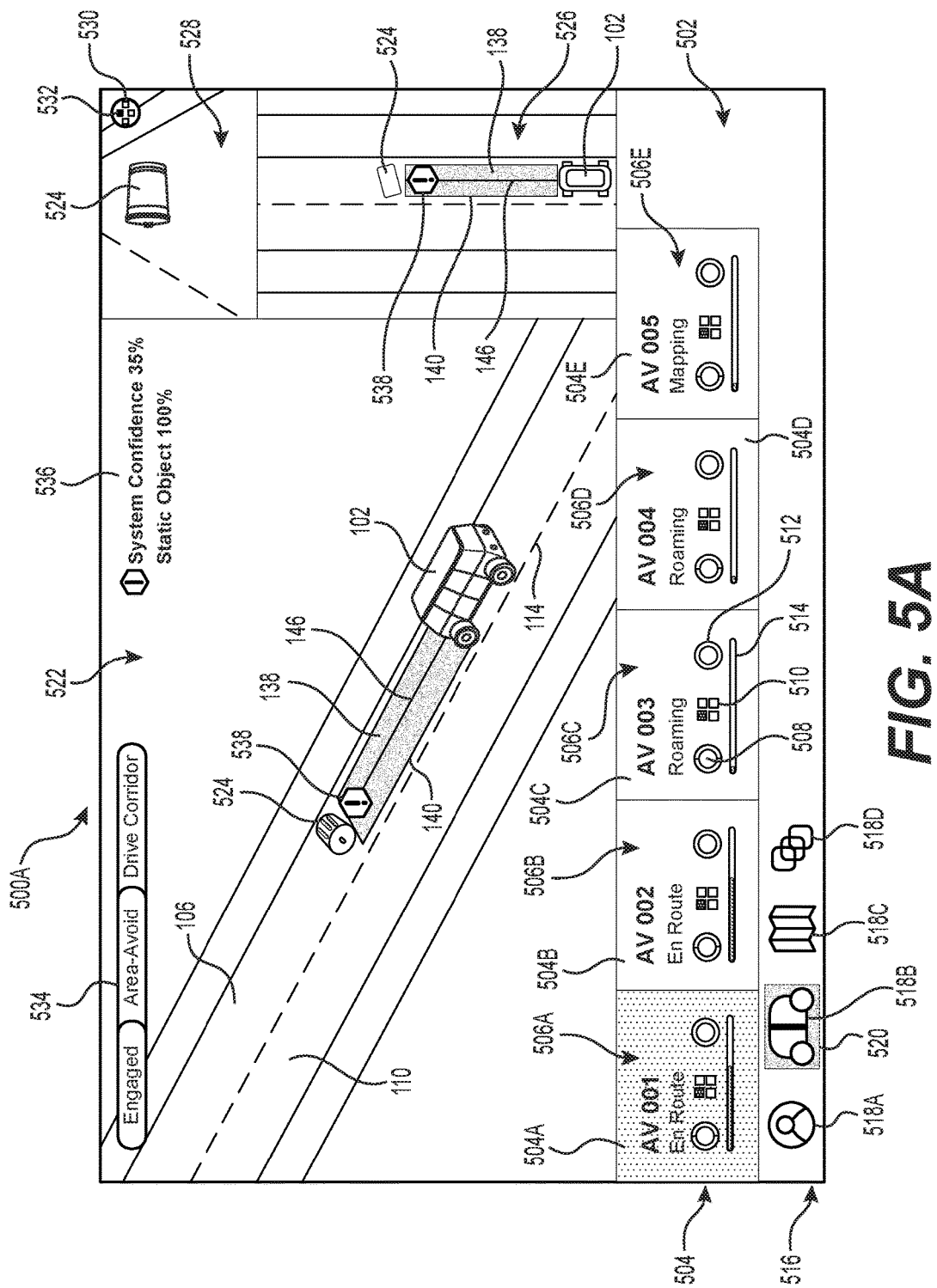
FIG. 5A is an example user interface (UI) to facilitate interaction between a teleoperator and an example vehicle in a first example event scenario in which an example static object is in the road.

FIG. 5A is an illustrative user interface (UI) 500A to facilitate interaction between a teleoperator 150 and an example vehicle 102 in a first example event scenario in which an example static object is in the road. The example UI 500A may be displayed via one or more of the displays 156A, 156B, and 156C. The example UI 500A shown in FIG. 5A includes a vehicle selection zone 502 providing multiple selectors 504 for selecting one of a number of vehicles 102 of the fleet 302 about which to display information related to its operation. In the example shown, the vehicle selection zone 502 includes selectors 504A, 504B, 504C, 504D, and 504E for selecting one of the vehicles designated, respectively, AV 001, AV 002, AV 003, AV 004, or AV 005. As shown in FIG. 5A, the information displayed relates to AV 001 as indicated by the shading of selector 504A, which corresponds to AV 001.

In some examples, such as shown, the selectors 504 each include status snapshots 506A, 506B, 506C, 506D, and 506E providing information related to the status of the respective vehicles 102. For example, status snapshots 506A and 506B indicate that AV 001 and AV 002 are "En Route," indicating they are currently between a start point and destination of respective trips. The status snapshots 506C and 506D indicate that AV 003 and AV 004 are "Roaming," indicating they are traveling the road network 104 without a defined destination. The example status snapshot 506E indicates that AV 005 is currently "Mapping," indicating that AV 005 is currently collecting data related to local map data and/or global map data. In some examples, the status snapshots 506 may also include a charge indicator 508, an occupancy indicator 510, and a vehicle speed indicator 512. The charge indicator 508 may show the level of charge remaining in one or more batteries of the vehicle 102. The example occupancy indicator 510 may show that the vehicle 102 has four seats, depicted as squares, with one seat occupied, as depicted by the shaded square. Some examples of the status snapshot 506 may also include a trip status bar 514 providing an indication of the amount of a planned trip of the vehicle 102 that has been completed. The form of the icons shown in FIG. 5A are exemplary, and icons having other forms are contemplated. The information shown in the status snapshots 506 is exemplary, and additional or other information may be shown.

The example UI 500A shown in FIG. 5A also includes a viewer selector bar 516, which includes view selector icons 518A, 518B, 518C, and 518D permitting the teleoperator to select a type of view shown in the UI 500A. In the example shown, the view selector icon 518A, if selected, may provide an interface for the teleoperator 150 to set preferences (e.g., default preferences) for the information shown by the UI 500A. The view selector icon 518B, selected in FIG. 5A as indicated by the shaded box 520 surrounding the view selector icon 518B, provides the teleoperator 150 with a view of the selected vehicle 102, for example, as shown in FIG. 5A. The view selector icon 518C, if selected, may provide the teleoperator 150 with a view of a map showing the road network 104 in an area relevant to operation of one or more of the vehicles 102 of the fleet 302. The view selector icon 518D, if selected, may facilitate configuring the information and/or the arrangement of information shown by the UI 500A. Although a three-dimensional representation of the selected vehicle 102 is illustrated in FIGS. 6A-9C, in some examples, any permutation of sensor data, operation state data, and/or teleoperations data may be presented in the UI, whether by a default, a setting, and/or a teleoperator input (e.g., via selection of a view selector icon).

For example, as shown in FIG. 5A, the view selector icon 518B has been selected, and the UI 500A includes an active view zone 522 providing a real-time simulated (or animated) perspective view of the vehicle 102 selected via the selector 504A. In the example shown, the active view zone 522 shows an animation depicting the vehicle 102 encountering an object 524 in the road 106. The teleoperator 150 may use the active view zone 522 to monitor the operation of, and the teleoperator's interaction with, the selected vehicle 102 (i.e., AV 001 in this example) before, during, and/or after the teleoperator 150 interacts with the vehicle 102 via the teleoperator interface 154. For example, the vehicle 102 may send communications signals to the teleoperator system 148 including sensor signals from one or more sensors associated with the vehicle 102 and/or a request for guidance and/or information from the teleoperations system 148. Based at least in part on the communications signals, the active view zone 522 provides a real-time perspective view of the vehicle 102 and the relevant environment. In some examples, the active view zone 522 may display any permutation of sensor data, operation state data, and/or teleoperations data. In some examples, as discussed herein, the permutation displayed may be determined a default, a setting, and/or a teleoperator input.

The example UI 500A shown in FIG. 5A also includes an overhead view zone 526, which provides an animated overhead view corresponding to the view shown in the active view zone 522. This provides the teleoperator 150 with an alternative view, which may assist the teleoperator 150 in situations for which an overhead view may facilitate the teleoperator's interaction with the vehicle 102.

The example UI 500A shown in FIG. 5A also includes a video view zone 528. In some examples, the video view zone 528 may provide a real-time video view from a video camera associated with the vehicle 102. In some examples, any data discussed herein as being "real-time" may additionally or alternatively include real-time data and/or historical data. This may assist the teleoperator 150 with quickly understanding the situation encountered by the vehicle 102. The example video view zone 528 also includes a view selector 530 which facilitates the teleoperator's selection of one of the video cameras associated with the vehicle 102. For example, the vehicle 102 may include cameras providing views from the perspective of one or more of the front, the sides, and the rear of the vehicle 102, and the view selector 530 may permit selection of one of the cameras from which to provide real-time video. In the example shown, a selector control 532 corresponding to the front camera has been selected, and the video view zone 528 shows the view from the front video camera of the vehicle 102.

The example UI 500A shown in FIG. 5A also includes an interaction bar 534, which may provide an indication of how the teleoperator 150 is interacting with a vehicle 102. For example, the interaction bar 534 may include icons for indicating whether the teleoperator 150 is interacting with the vehicle 102, which may be depicted by highlighting of the "Engaged" icon. If the teleoperator 150 is communicating with the vehicle 102 by identifying an area the vehicle 102 should avoid, the "Area-Avoid" icon may be highlighted. If the teleoperator 150 is communicating with the vehicle 102 by changing the driving corridor 138, the "Drive Corridor" icon may be highlighted. Other additional or alternate icons and/or related information are contemplated.

The example UI 500A shown in FIG. 5A also includes an alert bar 536 configured to provide an indication of the confidence level of the vehicle 102 (e.g., as determined by the vehicle systems 202) and/or an event being encountered by the vehicle 102. For example, as shown in FIG. 5A, the alert bar 536 indicates that the vehicle 102 has a confidence level of 35% as denoted by the alert bar 536 displaying "System Confidence 35%," and that the vehicle 102 has encountered a static object 524, and that the vehicle 102 has a confidence level of 100% that the object 524 is in the driving corridor 138 and that it is a static object. Other forms and types of alerts are contemplated. In some examples, a vehicle confidence level below a threshold confidence level (e.g., 90%, 85%, or 75%) may result in the vehicle 102 notifying the teleoperations system 148 of the status of the vehicle 102 by sending communication signals to the teleoperations system 148. Other threshold confidence levels are contemplated. In some examples, one or more of the active view zone 522, the overhead view zone 526, or the video view zone 528 may include an alert icon 538, which may include an exclamation point, for example, as shown.

In some examples, the UI 500A may include color-coded information. For example, alerts may be depicted in red, the driving corridor 138 may be depicted in green, and objects may be depicted in pink or red. Other color-coded combinations are contemplated.

FIG. 5A shows an example vehicle 102 in a first example event scenario in which the example static object 524 is in the road 106. In some examples, as the vehicle 102 approaches the object 524, the sensors 204 (FIG. 2) associated with the vehicle 102 may detect the object 524. Once detected, one or more of the planner 214, the object data calculator 216, the object classifier 218, the collision predictor system 220, and the kinematics calculator 222 (FIG. 2) may be used to determine the location of the object 524, classify the object 524, determine whether the object 524 is static or dynamic, and if the object is dynamic, predict a possible trajectory of the object 524. As the vehicle 102 approaches the object 524, one or more of these systems may be used to calculate a confidence level associated with a probability that the vehicle 102 will be able to successfully maneuver past the object 524, for example, without assistance from the teleoperations system 148. As the confidence level drops below a threshold minimum confidence level, the vehicle 102 may slow its speed or stop, and use its network interface 234 (FIG. 2) to send communication signals to the teleoperations system 148 providing sensor data and a request for guidance from the teleoperations system 148. In some examples, the request may be inferred and/or determined by the teleoperations system 148 based at least in part on, for example, the sensor data and or other information associated with the vehicle 102, such as its change in speed, confidence level, and/or other maneuvering that might be indicative of a need for guidance from the teleoperations systems 148. In some examples, the request may be inferred and/or determined based at least in part on the location of the vehicle 102 and/or knowledge of an event occurring at the location. The teleoperations receiver 304 (FIG. 3) of the teleoperations system 148 may receive the communication signals, the situation may be evaluated by a teleoperator 150 via the teleoperations interface 154 (with or without accessing the teleoperations data 310 via the teleoperations network 308), and the teleoperator 150 may send teleoperations signals to the vehicle 102 via the teleoperations transmitter 306 providing guidance, for example, as described herein.

In the example shown in FIG. 5A, the vehicle 102 approaches the object 524, for example, a garbage can on its side, until the driving corridor 138 overlaps with the object 524, at which point the confidence level drops below the threshold confidence level. The vehicle 102 sends communication signals to the teleoperations system 148 including a request for guidance, for example, as described herein. In the example shown, alert icons 538 are displayed in the active view zone 522 and the overhead view zone of the UI 500A to draw the teleoperator's attention to the object 524. The teleoperator 150 may use the teleoperator interface 154 to provide the requested guidance.

Figure 5B:
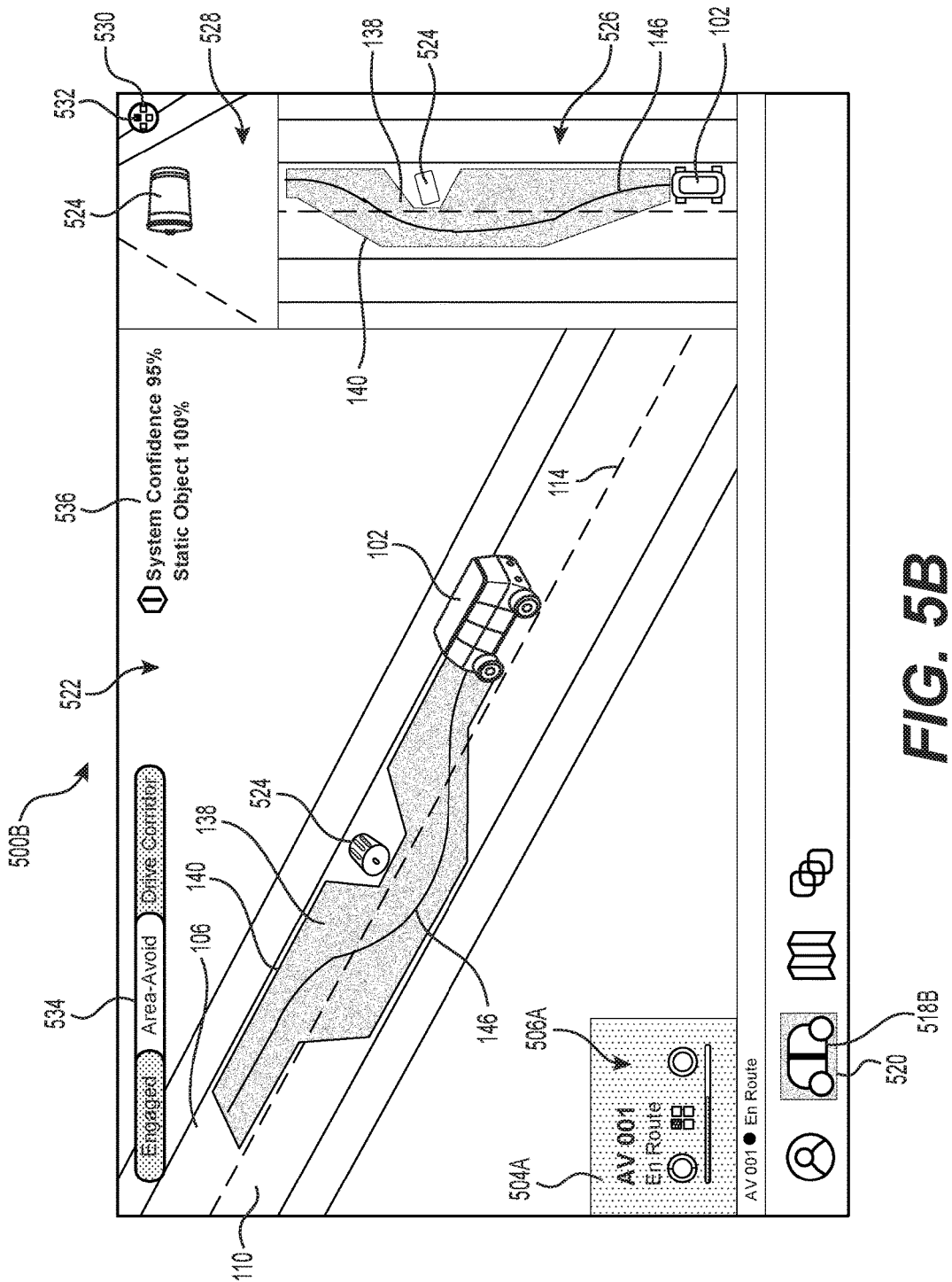
FIG. 5B is an example UI to facilitate interaction between a teleoperator and the example vehicle in the event scenario shown in FIG. 5A during example interaction between the teleoperator and the vehicle.

FIG. 5B is an example UI 500B configured to facilitate interaction between the teleoperator 150 and the example vehicle 102 in the example event scenario shown in FIG. 5A. In the example shown, the teleoperator 150 has selected the view selector icon 518B, so the UI 500B displays information related to the vehicle 102. For example, the active view zone 522 shows an animated perspective depiction of the vehicle 102 as it approaches the object 524. The overhead view zone 526 shows an animated overhead view of the vehicle 102 as it approaches the object 524, and the video view zone 528 shows a live video camera view of the object 524 in front of the vehicle 102. In some examples, the teleoperator 150 may select live video feed from a different camera by selecting a different one of the buttons 532 of the view selector 530.

The UI 500B shown in FIG. 5B shows example teleoperator 150 interaction with the vehicle 102. The example interaction bar 534 indicates that the teleoperator 150 is engaged with the vehicle 102, depicted by the shaded "Engaged" icon, and that the teleoperator 150 is altering the boundaries 140 of the driving corridor 138, depicted by the "Drive Corridor" icon being shaded. For example, the teleoperator 150 has expanded the boundaries 140 of the driving corridor 138 to the second lane 110, across the lane dividing line 114. In some examples, the teleoperator 150 may accomplish this using the teleoperations input device 158 (FIG. 4), which may involve the use of one or more of a touch-sensitive screen, a stylus, a mouse, a dial, a keypad, and/or a gesture-input system. Based on the teleoperator's 150 inputs, the teleoperations system 148 may transmit teleoperations signals to the vehicle 102 via the teleoperations transmitter 306 (FIG. 3). In the example shown, the vehicle 102 may expand the boundaries 140 of its driving corridor 138 in a manner consistent with the teleoperations signals, for example, as shown in FIG. 5B. Upon expansion of the driving corridor 138, the vehicle 102 may generate, for example, via the vehicle systems 202 (FIG. 2), a plurality of revised trajectories (e.g., concurrently or substantially simultaneously within technical capabilities) based at least in part on the altered boundaries 140 of the driving corridor 138. In the example shown, the alert bar 536 displays a revised confidence level ("System Confidence 95%) that is above the threshold confidence level. In some examples, the vehicle 102 may calculate a confidence level for each of the revised trajectories, and the vehicle 102 may select a revised trajectory having the highest confidence level from among the plurality of revised trajectories. Based at least in part on the selected revised trajectory, the vehicle 102 may determine a revised drive line 146 for use in maneuvering around the object 524. Thereafter, the vehicle controller 228 (FIG. 2) may be configured to operate the vehicle 102 according to the revised drive line 146, for example, as shown in FIG. 5B, and maneuver around the object 524.

In some examples, the communication signals from the vehicle 102 may include a proposed drive line 146 to maneuver around the object 524, and the teleoperations system 148 may evaluate the proposed drive line 146 and determine that the proposed revised drive line 146 is either acceptable or unacceptable. If acceptable, the teleoperations system 148 may send teleoperations signals including an indication of approval of the revised drive line 146 proposed by the vehicle 102. If unacceptable, the teleoperations system 148 may determine an alternative proposed drive line, and send teleoperations signals to the vehicle 102, including a denial of the revised drive line 146 proposed by the vehicle 102 and the alternative proposed drive line for evaluation and possible execution by the vehicle 102.

In some examples, the teleoperations interface 154 may be configured to permit the teleoperator 150 to advise the teleoperations system 148 and/or other vehicles 102 of the fleet 302 about the object 524 in the road 106. For example, the teleoperations interface 154 may facilitate identification of the location and information associated with the object 524 (e.g., its classification and/or whether it is static or dynamic) for use by the teleoperations system 148 and/or other vehicles 102 of the fleet 302. This information may result in vehicles 102 avoiding the area associated with the object 524 or may provide guidance for vehicles 102 that encounter the object 524 and/or teleoperators assisting vehicles 102 as they encounter the object 524. In some examples, as time passes from the initial encounter with the object 524, the teleoperations system 148 may reduce the confidence level associated with the information related to the object 524, for example, until another vehicle 102 confirms that the object 524 remains in in the road 106 or that the object 524 is no longer in the road 106.

Figure 6A:
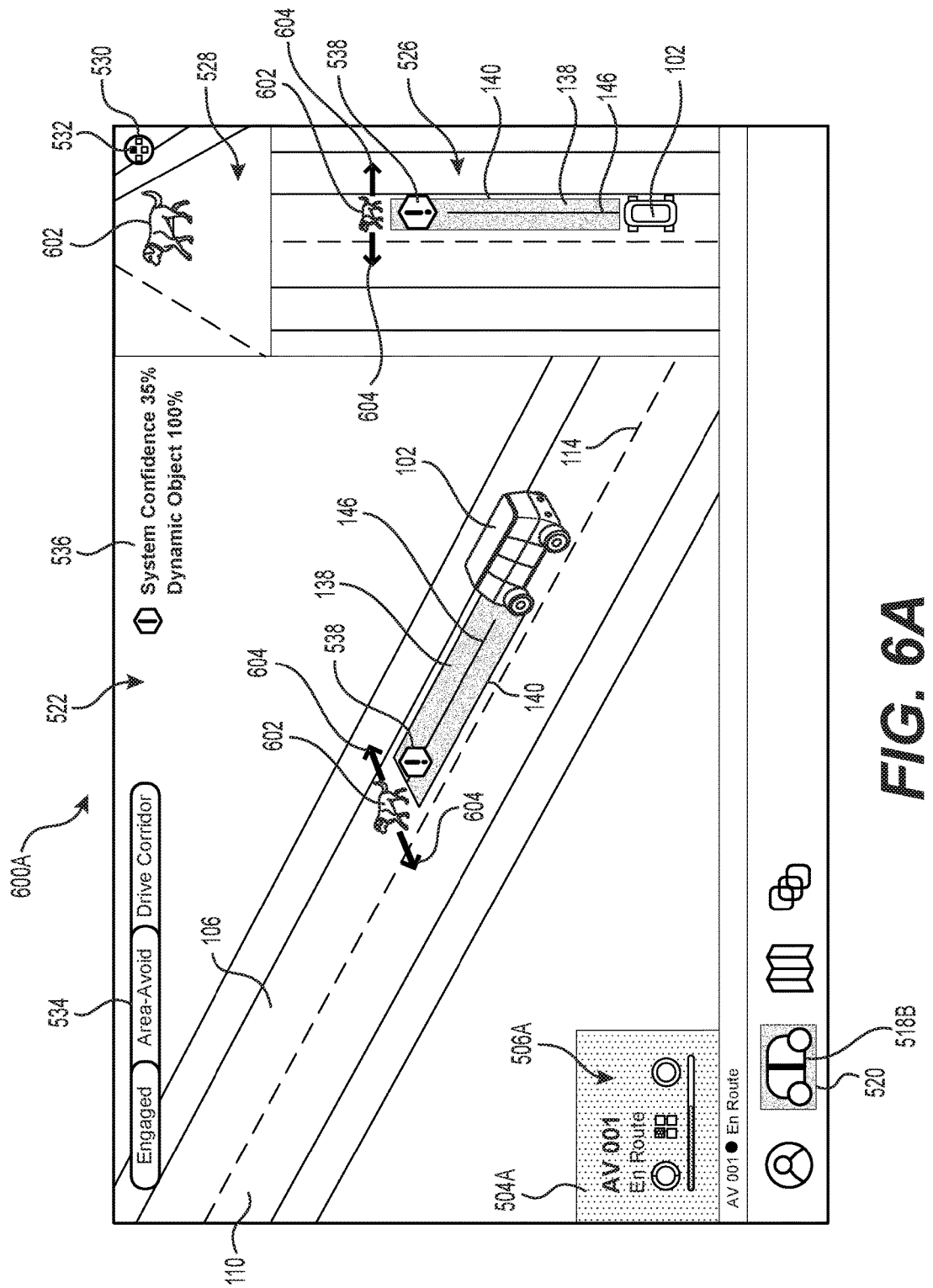
FIG. 6A is an example UI to facilitate interaction between a teleoperator and an example vehicle in a second example event scenario in which an example dynamic object is in the road.

FIG. 6A is an example UI 600A to showing an example vehicle 102 in a second example event scenario in which an example dynamic object 602 is in the road 106. In the example shown, the dynamic object 602 is a dog. As the vehicle 102 approaches the dynamic object 602, the sensors 204 associated with the vehicle 102 may detect the object 602, and once detected, the vehicle 102 may determine the location of the dynamic object 602, classify the dynamic object 602, and/or predict a possible trajectory of the dynamic object 602. As the vehicle 102 approaches the dynamic object 602, the vehicle 102 may calculate a confidence level associated with a probability that the vehicle 102 will be able to successfully maneuver past the dynamic object 602, for example, without assistance from the teleoperations system 148. As the confidence level drops below a threshold minimum confidence level, the vehicle 102 may slow its speed or stop, and use its network interface 234 to send communication signals to the teleoperations system 148 providing sensor data and a request for guidance from the teleoperations system 148. In some examples, the request may be inferred and/or determined by the teleoperations system 148, for example, as noted above. The teleoperations system 148 may receive the communication signals, the situation may be evaluated by a teleoperator 150 via the teleoperations interface 154, and the teleoperator 150 may send teleoperations signals to the vehicle 102 via the teleoperations transmitter 306 providing guidance, for example, as described herein.

In some examples, the alert bar 536 may show that a dynamic object 602 has been detected, and the confidence level associated with this detection, for example, as shown in FIG. 6A. The UI 600A may also provide an indication that the dynamic object 602 is dynamic by including one or more arrows 604 in one or more of the views of the scenario. In some examples, arrows 604 may provide an indication of a predicted trajectory of the dynamic object 602 based on, for example, its type and/or classification, and/or its prior and/or current trajectory.

Figure 6B:
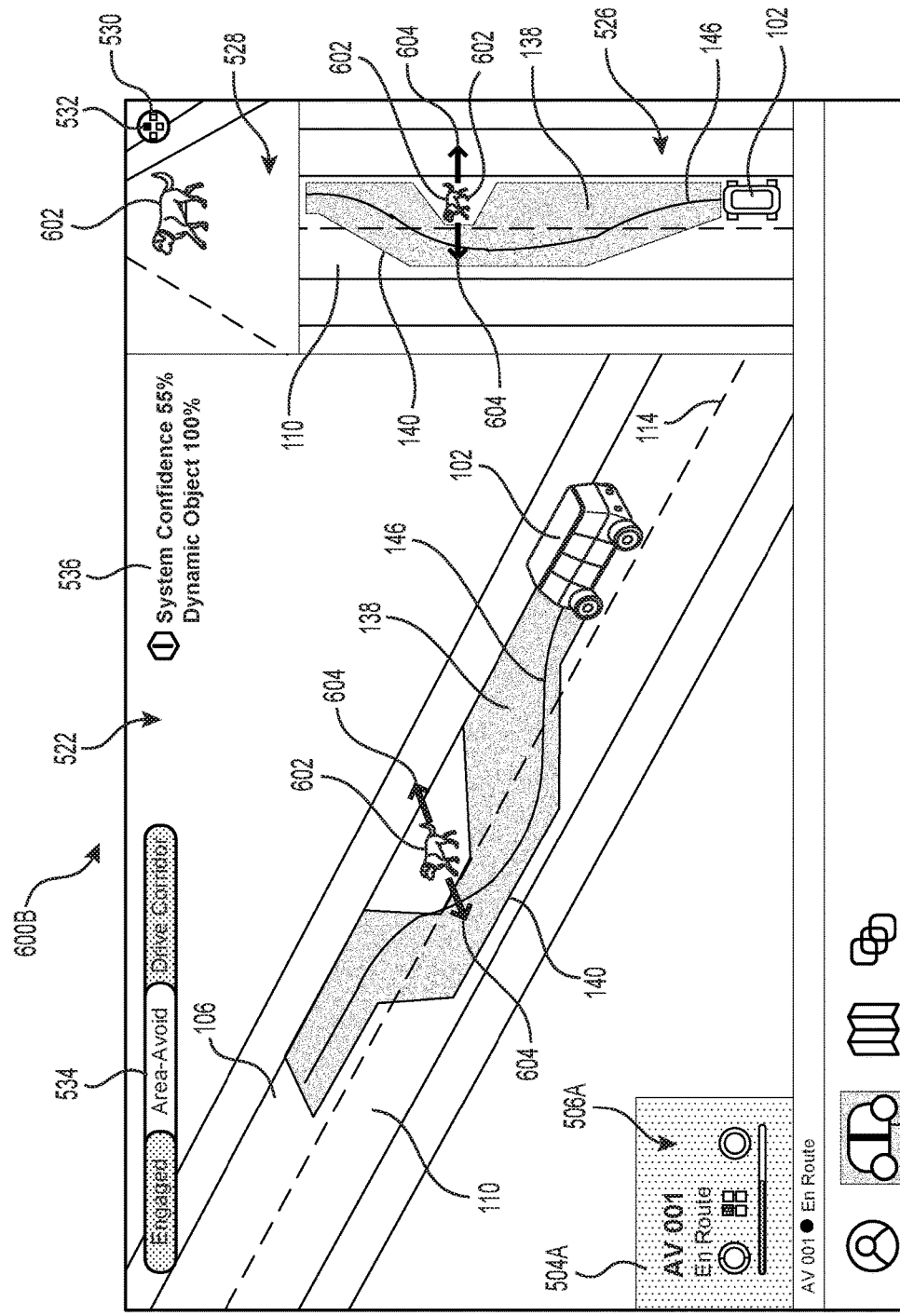
FIG. 6B is an example UI to facilitate interaction between a teleoperator and the example vehicle in the event scenario shown in FIG. 6A during example interaction between the teleoperator and the vehicle.

FIG. 6B is an example UI 600B configured to facilitate interaction between the teleoperator 150 and the example vehicle 102 in the example event scenario shown in FIG. 6A. In the example shown, the example interaction bar 534 indicates that the teleoperator 150 is engaged with the vehicle 102, depicted by the shaded "Engaged" icon, and that the teleoperator 150 is altering the boundaries 140 of the driving corridor 138, depicted by the "Drive Corridor" icon being shaded. For example, the teleoperator 150 has expanded the boundaries 140 of the driving corridor 138 to the second lane 110, across the lane dividing line 114. In some examples, the teleoperator 150 may accomplish this using the teleoperations input device 158. Based on the teleoperator's 150 inputs, the teleoperations system 148 may transmit teleoperations signals to the vehicle 102 via the teleoperations transmitter 306. In the example shown, the vehicle 102 may expand the boundaries 140 of its driving corridor 138 in a manner consistent with the teleoperations signals, for example, as shown in FIG. 6B. Upon expansion of the driving corridor 138, the vehicle 102 may generate a plurality of revised trajectories based at least in part on the altered boundaries 140 of the driving corridor 138. The vehicle 102 may calculate a confidence level for each of the revised trajectories, and the vehicle 102 may select a revised trajectory having the highest confidence level from among the plurality of revised trajectories. Based at least in part on the selected revised trajectory, the vehicle 102 may determine a revised drive line 146 for use in maneuvering around the dynamic object 602. Thereafter, the vehicle controller 228 may be configured to operate the vehicle 102 according to the revised drive line 146, for example, as shown in FIG. 6B, and maneuver around the dynamic object 602.

In some examples, however, the teleoperator 150 may determine a different course of action. For example, the dynamic object 602 shown in FIGS. 6A and 6B is an unattended animal (e.g., a dog not on a leash and without movement being controlled by a person). The future movement of an unattended animal may be particularly unpredictable, and thus, expanding the boundaries 140 of the driving corridor 138, for example, as shown in FIG. 6B may not be acceptable. For example, expanding the boundaries 140 of the driving corridor 138 may not result in increasing the confidence level above the threshold confidence level. Thus, in some such examples, the teleoperator 150 may send teleoperations signals providing guidance for the vehicle 102 to encourage the animal to remove itself from the road 106. For example, the guidance may take the form of a proposal for the vehicle controller 228 to move the vehicle 102 slowly forward, for example, a predetermined distance and stop. Such movement may encourage the animal to exit the road 106. Alternatively, or in addition, the guidance may include a proposal for the vehicle 102 to sound an audible warning and/or activate lighting to provide a visual warning. Some vehicles 102 may include speakers (or other forms of noise generator) and lighting, and the vehicle 102 may activate the speakers and/or the lighting, which may encourage the animal to exit the road 106, after which, the vehicle 102 may return to its original drive line 146 or a similar trajectory, depending on whether the animal has exited the road 106.

Figure 7A:
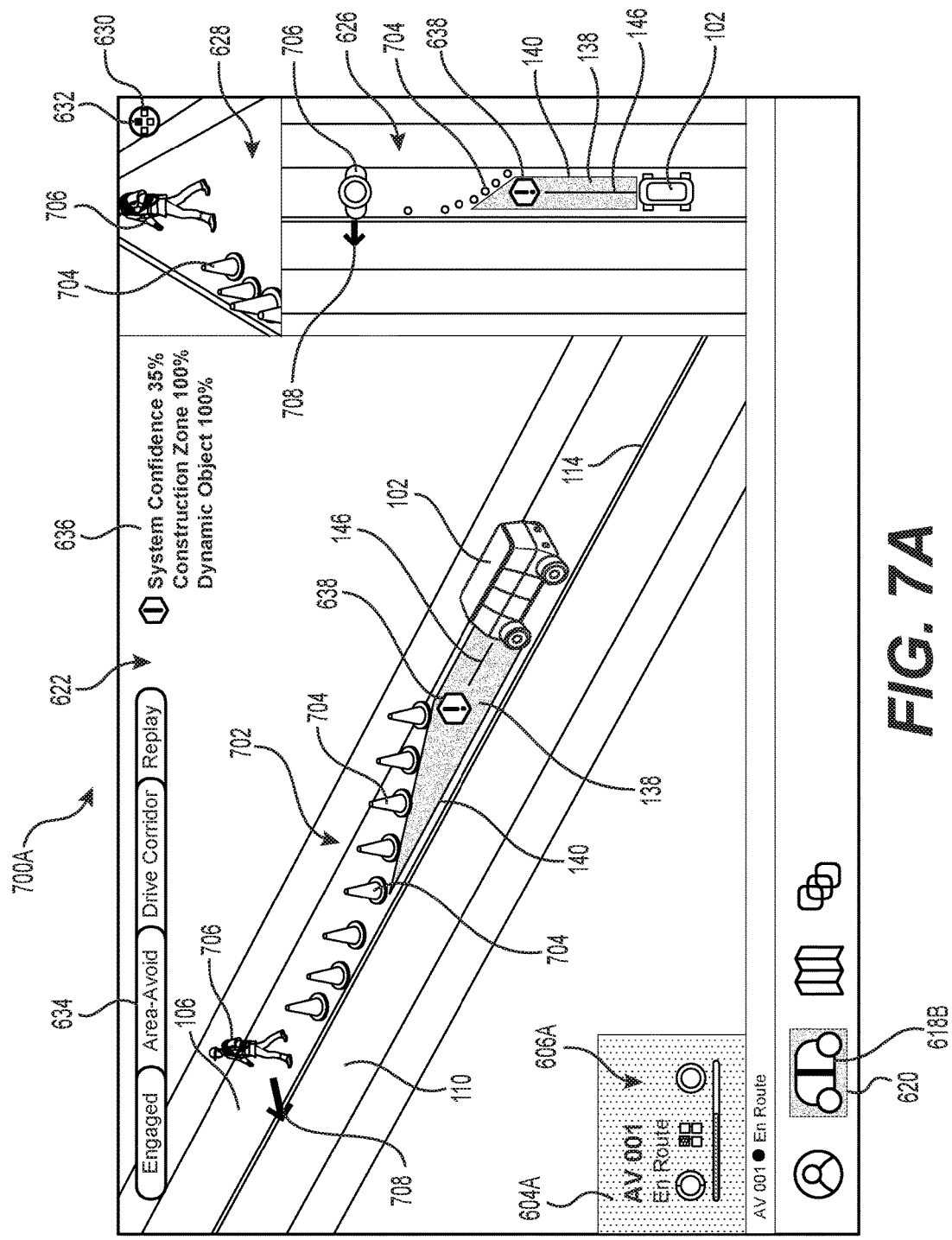
FIG. 7A is an example UI to facilitate interaction between a teleoperator and an example vehicle in a third example event scenario in which the vehicle has encountered an example construction zone that includes both example static and dynamic objects in the road.

FIG. 7A is an example UI 700A showing a third event scenario in which the vehicle 102 has encountered an example construction zone 702 that includes both example static objects 704 and an example dynamic object 706 in the road 106. In the example shown, the static objects 704 are traffic cones, and the dynamic object 706 is a person. As the vehicle 102 approaches the construction zone 702, the sensors 204 associated with the vehicle 102 may detect the static objects 704 and/or the dynamic object 706, and once detected, the vehicle 102 may determine the location of the static objects 704 and the dynamic object 706, classify them, and/or predict a possible trajectory of the dynamic object 706. As the vehicle 102 approaches the construction zone 702, the vehicle 102 may calculate a confidence level associated with a probability that the vehicle 102 will be able to successfully maneuver past the constructions zone, for example, without assistance from the teleoperations system 148. As the confidence level drops below a threshold minimum confidence level, the vehicle 102 may slow its speed or stop, and use its network interface 234 to send communication signals to the teleoperations system 148 providing sensor data and a request for guidance from the teleoperations system 148. In some examples, the request may be inferred and/or determined by the teleoperations system 148. The teleoperations system 148 may receive the communication signals, the situation may be evaluated by a teleoperator 150 via the teleoperations interface 154, and the teleoperator 150 may send teleoperations signals to the vehicle 102 via the teleoperations transmitter 306 providing guidance.

In the example shown in FIG. 7A, the alert bar 536 of the UI 700A indicates for the teleoperator 150 that the vehicle 102 has arrived at a construction zone, and that there is at least one static object and at least one dynamic object associated with the construction zone, and further, that the confidence level associated with each of those identifications is 100%. The alert bar 536 also indicates that the confidence level of the vehicle 102 is 35% by displaying "System Confidence 35%." In the example shown, one or more arrows 708 may provide an indication of a predicted trajectory of the dynamic object 706 based on, for example, its type and/or classification, and/or its prior and/or current trajectory.

Figure 7B:
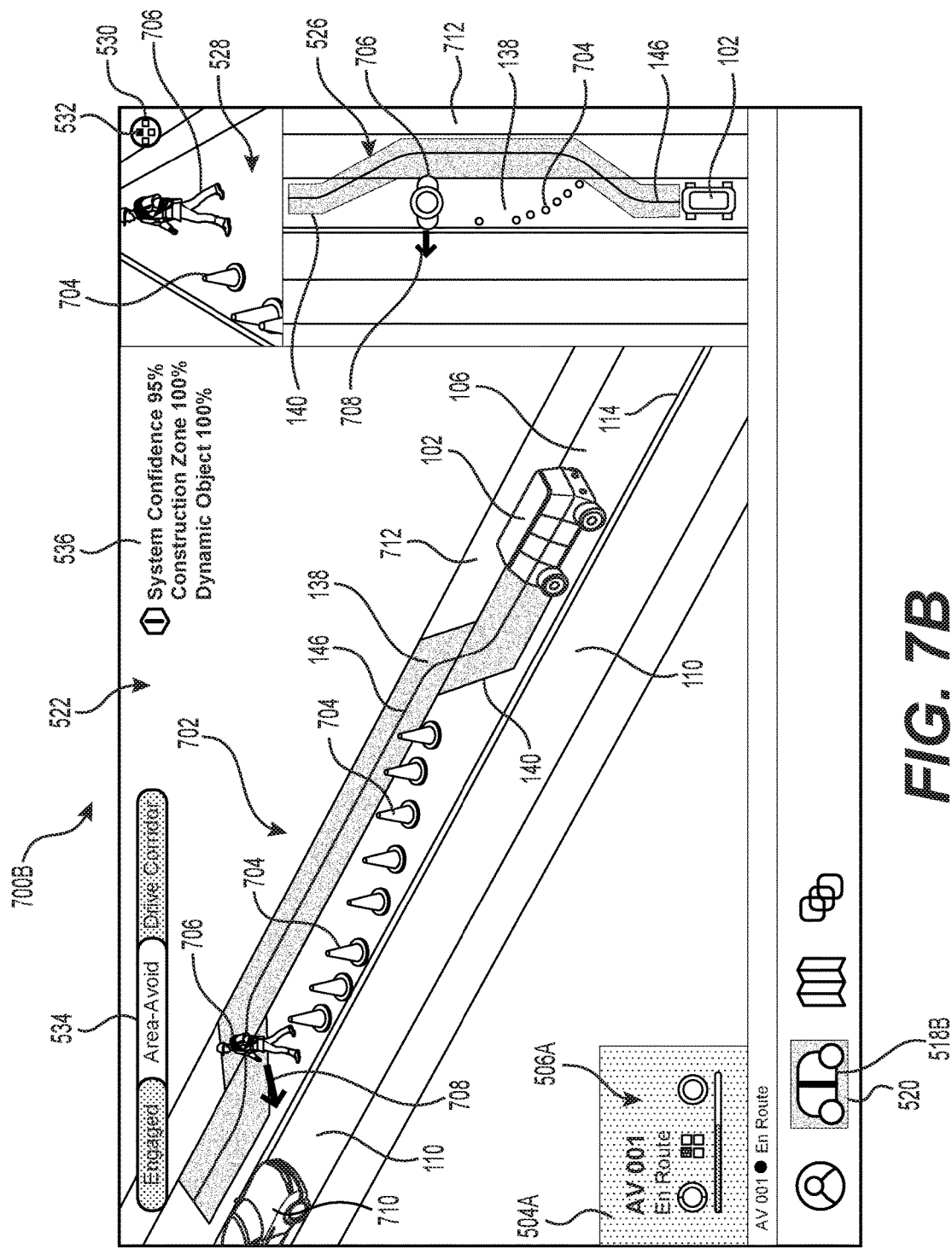
FIG. 7B is an example UI to facilitate interaction between a teleoperator and the example vehicle in the event scenario shown in FIG. 7A during example interaction between the teleoperator and the vehicle.

FIG. 7B is an example UI 700B configured to facilitate interaction between the teleoperator 150 and the example vehicle 102 in order to overcome the example construction zone 702 shown in FIG. 7A. In the example shown, a second vehicle 710 is approaching the vehicle 102 in the second lane 110, thus rendering it dangerous to cross the dividing line 114, which, in this example, is a double-yellow line, to maneuver around the construction zone 702. The example interaction bar 534 indicates that the teleoperator 150 is engaged with the vehicle 102, depicted by the shaded "Engaged" icon, and that the teleoperator 150 is altering the boundaries 140 of the driving corridor 138, depicted by the "Drive Corridor" icon being shaded. As shown, the teleoperator 150 has expanded the boundaries 140 of the driving corridor 138 to the shoulder 712 of the road 106 on the same side of the dividing line 114 as the vehicle 102 to avoid the oncoming second vehicle 710 and permitting the vehicle 102 to maneuver past the construction zone 702, which is not present in the shoulder 712. In some examples, the teleoperator 150 may accomplish this using the teleoperations input device 158, for example, as noted above. Based on the teleoperator's inputs, the teleoperations system 148 may transmit teleoperations signals to the vehicle 102 via the teleoperations transmitter 306. In the example shown, the vehicle 102 has expanded the boundaries 140 of its driving corridor 138 in a manner consistent with the teleoperations signals, for example, as shown in FIG. 7B. Upon expansion of the driving corridor 138, the vehicle 102 may generate a plurality of revised trajectories based at least in part on the altered boundaries 140 of the driving corridor 138. The vehicle 102 may calculate a revised confidence level for each of the revised trajectories, and may select the revised trajectory having the highest confidence level from among the plurality of revised trajectories. In the example shown, the alert bar 536 indicates that the revised confidence level of the vehicle 102 is 95% by displaying "System Confidence 95%." Based at least in part on the selected revised trajectory, the vehicle 102 may determine a revised drive line 146 for use in maneuvering past the construction zone 702 including the static objects 704 and the dynamic object 706. Thereafter, the vehicle controller 228 may be configured to operate the vehicle 102 according to the revised drive line 146, for example, as shown in FIG. 7B, and maneuver past the construction zone 702.

In some examples, a teleoperator 150 may be able to use the live video feed shown in the video view zone 528 to provide guidance to the vehicle 102 in a zone such as the construction zone 702. For example, in a construction zone one or more construction workers or traffic police may be present to direct traffic through or around the construction zone. In some such examples, the vehicle 102 may send communication signals to the teleoperations system 148 including live video signals, which may be viewed by the teleoperator 150 via the video view zone 528. Although in the example shown, the video view zone 528 is confined to the upper right-hand corner of the example UIs 700A and 700B, in some examples, the teleoperator 150 may be able to reconfigured to UIs 700A and 700B so that the video view zone 528 occupies a larger portion of the display. By viewing the live video, the teleoperator may be able to see the person directing traffic and send teleoperations signals to the vehicle 102 providing guidance to adhere to the direction of the person directing traffic, such that the vehicle controller 228 can maneuver the vehicle 102 through or around the construction zone.

Figure 8A:
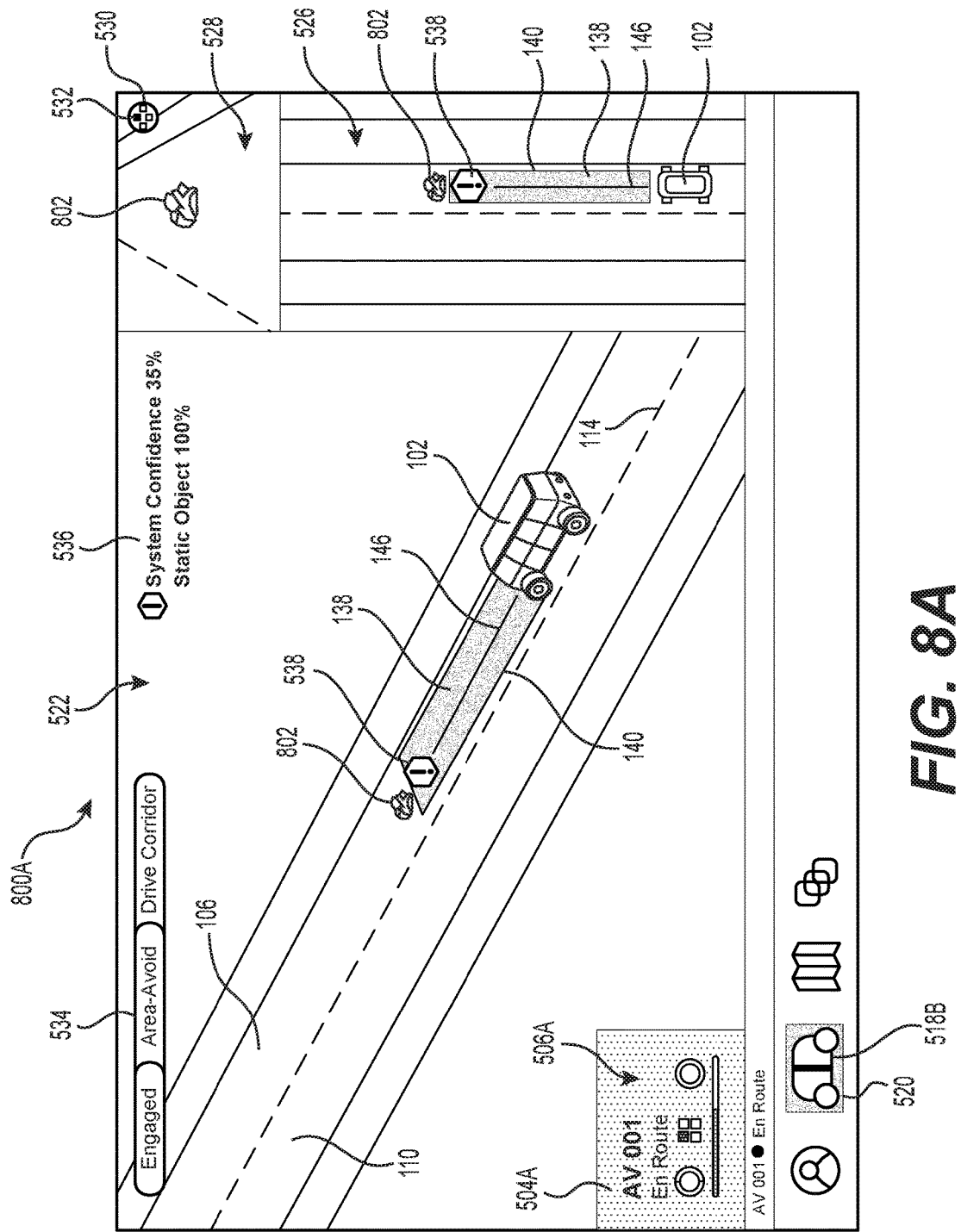
FIG. 8A is an example UI to facilitate interaction between a teleoperator and an example vehicle in a fourth example event scenario in which an example static object is in the road.

FIG. 8A is an example UI 800A showing a fourth event scenario in which the vehicle 102 has encountered an example static object 802 in the road 106. In the example shown, the static object 802 is trash (e.g., a ball of paper or other sheet material). As the vehicle 102 approaches the static object 802, the sensors 204 associated with the vehicle 102 may detect the static object 802, and the vehicle 102 may determine the location of the static object 802 and classify it. As the vehicle 102 approaches the static object 802, the vehicle 102 may calculate a confidence level, which, due to the static object 802 in the road 106, may drop below a threshold minimum confidence level. As a result, the vehicle 102 may slow its speed or stop, and use its network interface 234 to send communication signals to the teleoperations system 148 providing sensor data and a request for guidance from the teleoperations system 148. The request may be inferred and/or determined by the teleoperations system 148, for example, as noted above. The teleoperations system 148 may receive the communication signals, the situation may be evaluated by a teleoperator 150 via the teleoperations interface 154, and the teleoperator 150 may send teleoperations signals to the vehicle 102 via the teleoperations transmitter 306 providing guidance, for example, as described herein.

Figure 8B:
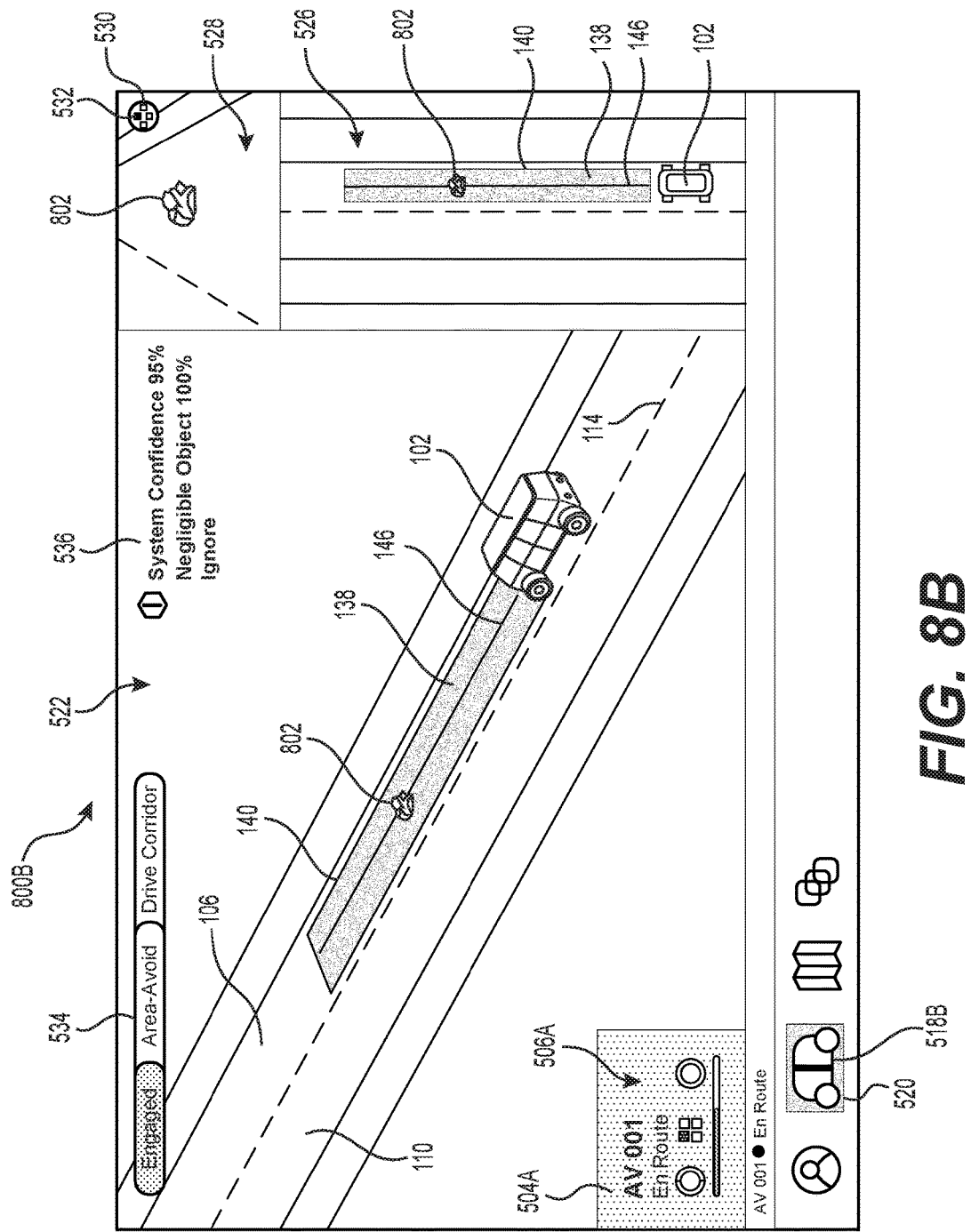
FIG. 8B is an example UI to facilitate interaction between a teleoperator and the example vehicle in the event scenario shown in FIG. 8A during example interaction between the teleoperator and the vehicle.

The example UI 800B shown in FIG. 8B shows example teleoperator 150 interaction with the vehicle 102 to address the static object 802 shown in FIGS. 8A and 8B. The example interaction bar 534 indicates that the teleoperator 150 is engaged with the vehicle 102, depicted by the shaded "Engaged" icon. However, the teleoperator 150 may be able to determine from the communication signals received from the vehicle 102 that the static object 802 is trash that does not need to be avoided. As such, the teleoperator 150 may send teleoperations signals to the vehicle 102 providing guidance proposing to ignore the static object 802. Based on this proposal, the vehicle 102 may maintain its original drive line 146, or may adjust it only slightly without altering the boundaries 140 of the driving corridor 138, and continue to maneuver via the vehicle controller 228 according to the original drive line 146.

Figure 9A:
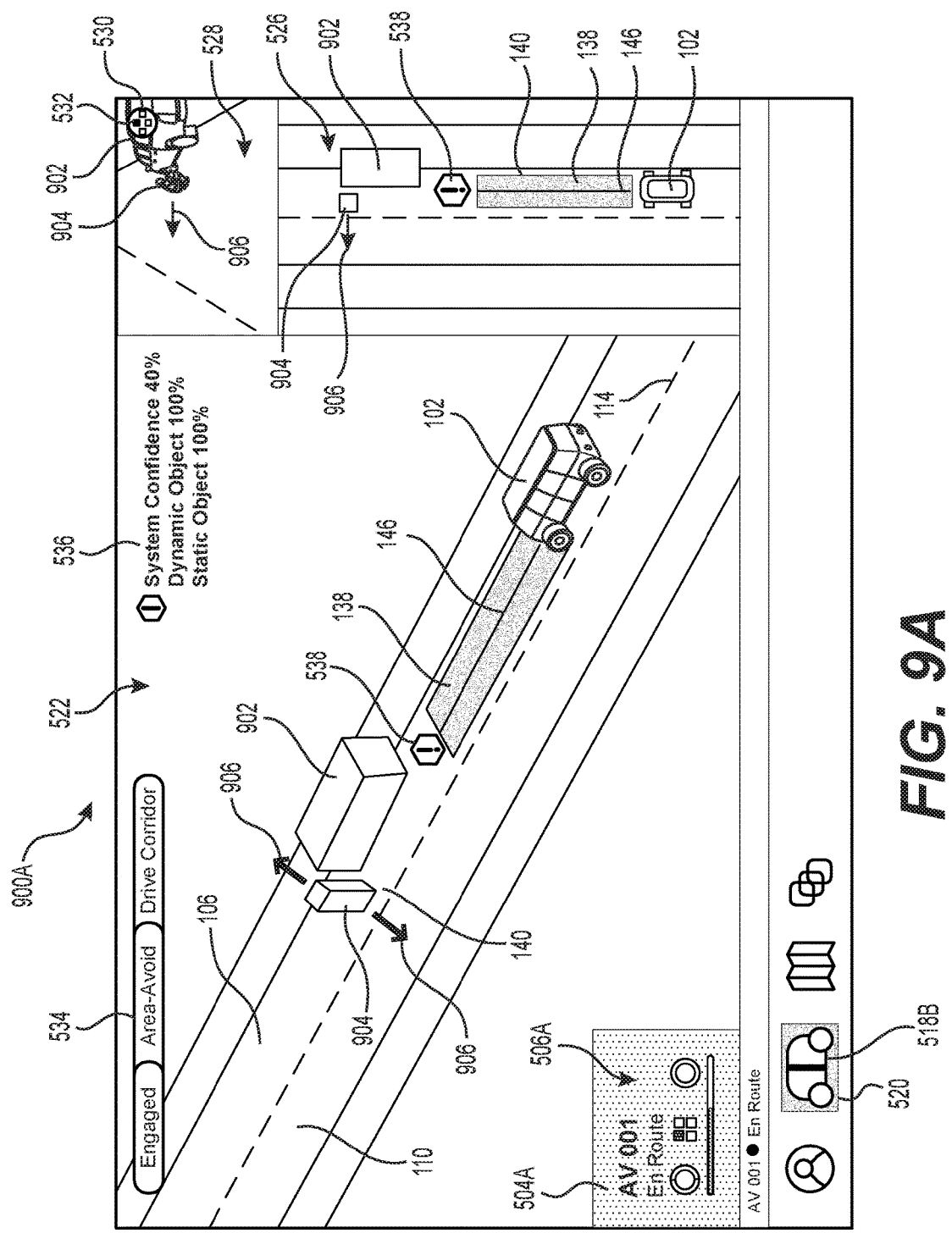
FIG. 9A is an example UI to facilitate interaction between a teleoperator and an example vehicle when the example vehicle encounters another vehicle parked partially in the road with a potentially dynamic object also in the road.
Figure 9B:
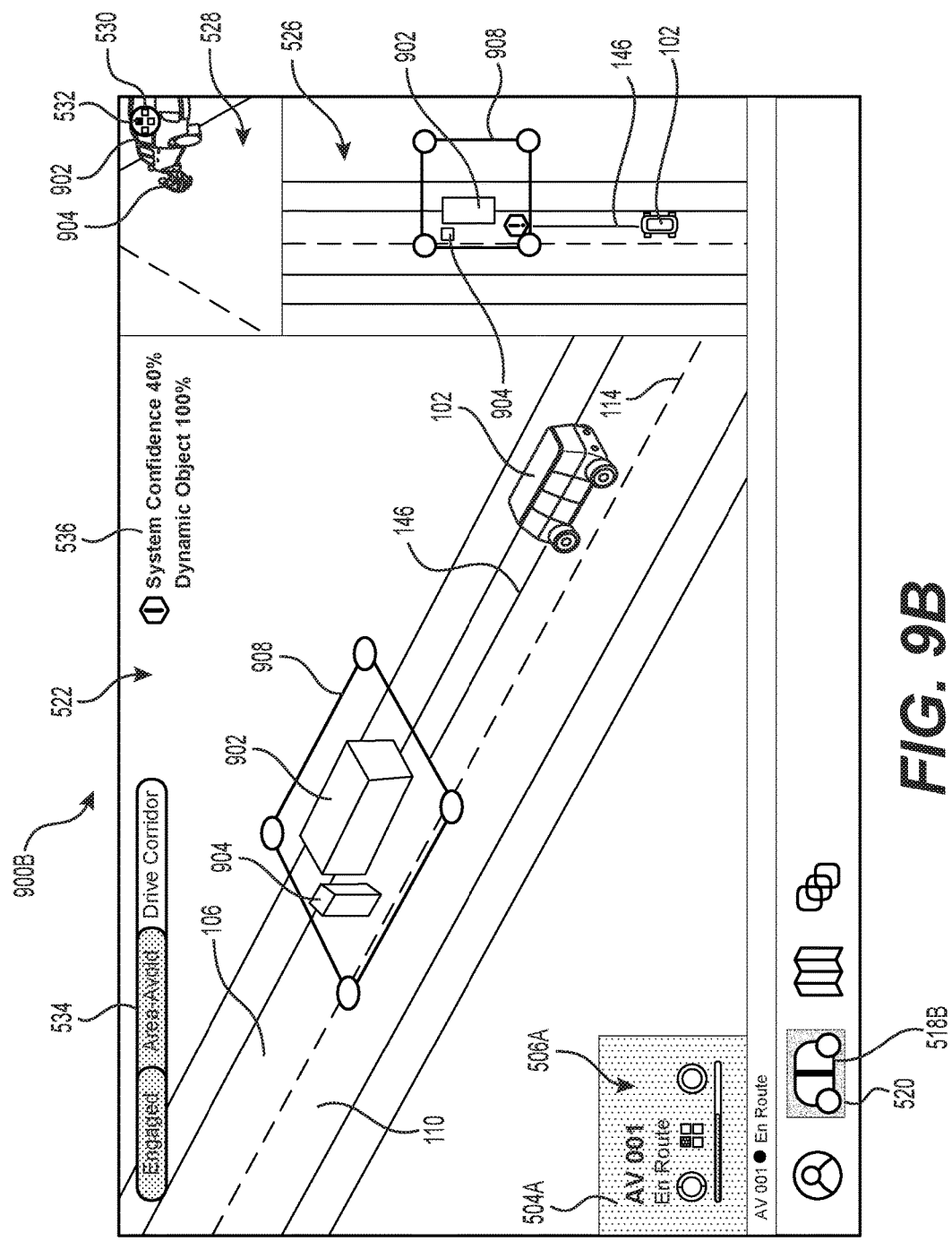
FIG. 9B is an example UI to facilitate interaction between a teleoperator and the example vehicle in the event scenario shown in FIG. 9A during example interaction between the teleoperator and the vehicle.
Figure 9C:
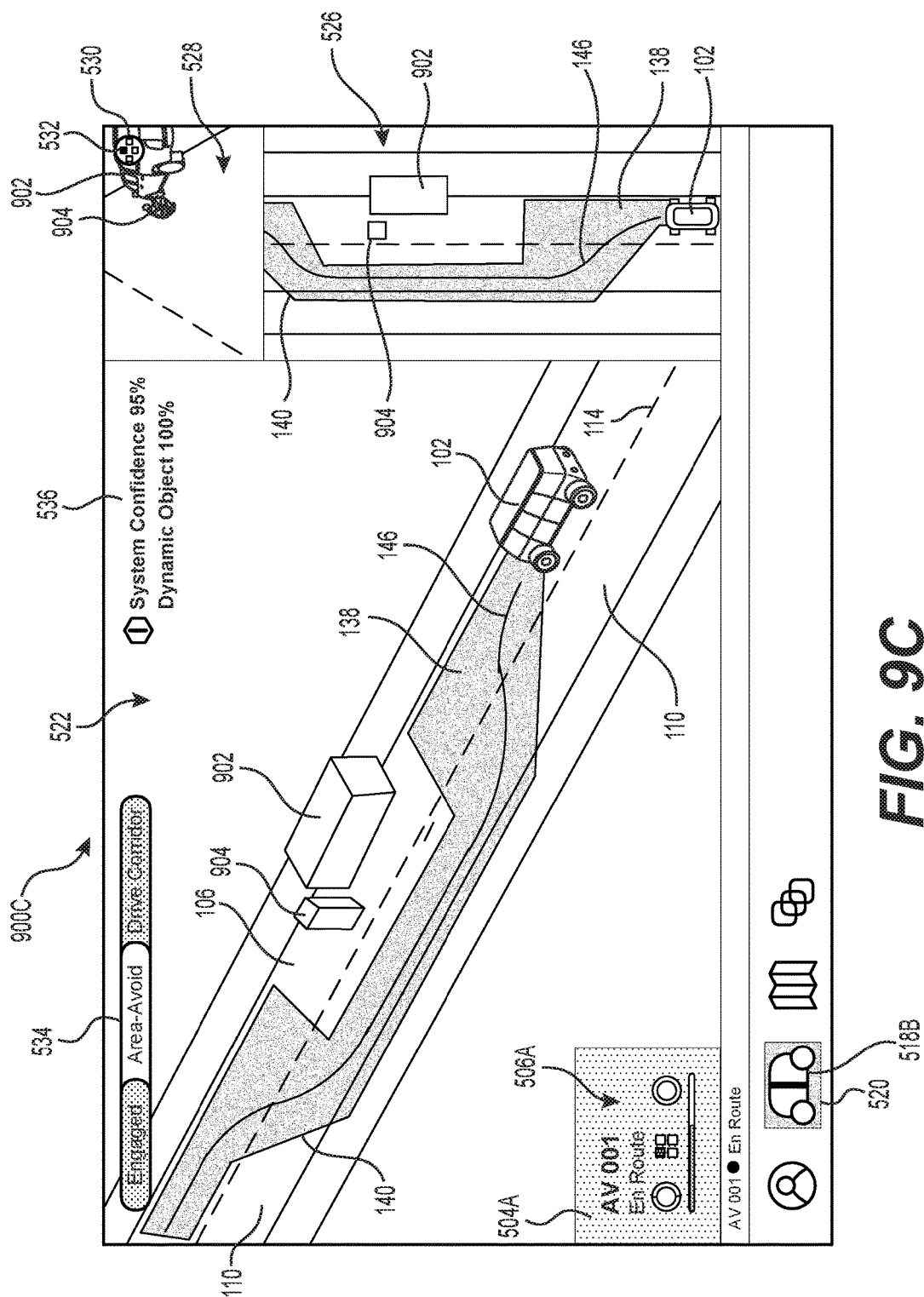
FIG. 9C is an example UI to facilitate interaction between a teleoperator and the example vehicle in the event scenario shown in FIGS. 9A and 9B during example interaction between the teleoperator and the vehicle.

FIGS. 9A-9C show example UIs 900A-900C showing a fifth event scenario in which the vehicle 102 has encountered a roadside repair that includes both an example static object 902 and an example dynamic object 904 at least partially the lane 110A in the road 106. In the example shown, the static object 902 is a car, and the dynamic object 904 is a person conducting a repair, in this example, changing a tire. As the vehicle 102 approaches the static and dynamic objects 902 and 904, the sensors 204 associated with the vehicle 102 may detect one or both of them, and the vehicle 102 may determine the locations of the static and dynamic objects 902 and 904, classify them, and/or predict a possible trajectory of the dynamic object 904. As the vehicle 102 approaches, it may calculate a confidence level associated with a probability that the vehicle 102 will be able to successfully maneuver past the static and dynamic objects 902 and 904. As the confidence level drops below a threshold minimum confidence level, the vehicle 102 may slow its speed or stop, and use its network interface 234 to send communication signals to the teleoperations system 148 providing sensor data and a request for guidance from the teleoperations system 148. As noted above, the request may be inferred and/or determined by the teleoperations system 148. The teleoperations system 148 may receive the communication signals, the situation may be evaluated by a teleoperator 150 via the teleoperations interface 154, and the teleoperator 150 may send teleoperations signals to the vehicle 102 via the teleoperations transmitter 306 providing guidance.

In the example shown in FIG. 9A, the alert bar 536 of the UI 900A indicates for the teleoperator 150 that the vehicle 102 has arrived at at least one static object and at least one dynamic object in the road 106, which obstruct the drive line 146 of the vehicle 102, and that the confidence levels associated with each of those identifications is 100%. In the example shown, one or more arrows 906 may provide an indication of a predicted trajectory of the dynamic object 904 based on, for example, its type and/or classification, and/or its prior and/or current trajectory. In this example, the dynamic object 904 is a person kneeling next to the tire of the car, and thus, it is unlikely the person will move farther into the road 106. In the example UI 900A shown in FIG. 9A, the active view zone 522 depicts the scenario as a schematic perspective animation, and the video view zone 528 provides a live video of the static and dynamic objects 902 and 904. In some situations, it may be easier for the teleoperator 150 to more quickly and/or more accurately determine the nature of the event being encountered by the vehicle 102 by viewing the video view zone 528. This may result in the teleoperator 150 being able to provide the vehicle 102 with guidance more quickly and/or more accurately.

FIG. 9B shows an example UI 900B providing an example of the teleoperator 150 providing guidance to the vehicle 102. The example interaction bar 534 indicates that the teleoperator 150 is engaged with the vehicle 102, depicted by the shaded "Engaged" icon, and that the teleoperator 150 is identifying an area for the vehicle 102 to avoid, depicted by the "Area-Avoid" icon being shaded. As shown, the teleoperator 150 has used the teleoperations input device to erect a virtual wall 908 around the static and dynamic objects 902 and 904 to notify the vehicle 102 to avoid entering the area bounded by the virtual wall 908.

FIG. 9C an example UI 900C providing a revised driving corridor 138 based on the area bounded by the virtual wall 908 shown in FIG. 9B. In the example shown, the teleoperator 150 has expanded the boundaries 140 of the driving corridor 138 to the second lane 110, across the lane dividing line 114. In some examples, the teleoperator 150 may accomplish this using the teleoperations input device 158, for example, as noted above. Based on the teleoperator's inputs, the teleoperations system 148 may transmit teleoperations signals to the vehicle 102 via the teleoperations transmitter 306. In the example shown, the vehicle 102 may expand the boundaries 140 of its driving corridor 138 in a manner consistent with the teleoperations signals, for example, as shown in FIG. 9C. Upon expansion of the driving corridor 138, the vehicle 102 may generate a plurality of revised trajectories based at least in part on the altered boundaries 140 of the driving corridor 138. The vehicle 102 may calculate a confidence level for each of the revised trajectories, and may select a revised trajectory having the highest confidence level from among the plurality of revised trajectories. Based at least in part on the selected revised trajectory, the vehicle 102 may determine a revised drive line 146 for use in maneuvering past the static and dynamic objects 902 and 904. Thereafter, the vehicle controller 228 may be configured to operate the vehicle 102 according to the revised drive line 146, for example, as shown in FIG. 9C and maneuver past the event.

Figure 10:
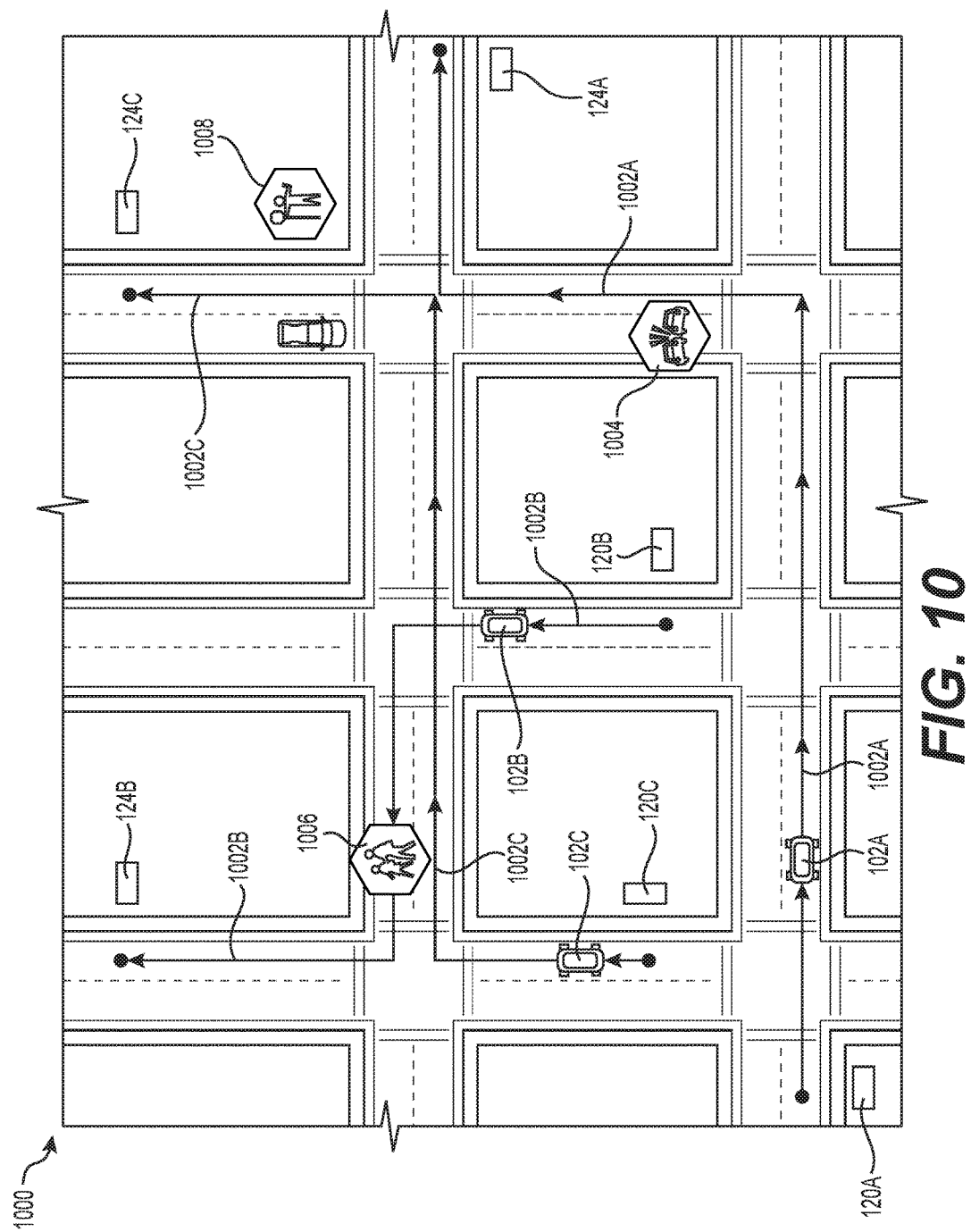
FIG. 10 is a schematic overhead view of an example road network including several example vehicles en route between respective first geographic areas and respective destinations at second geographic areas.

FIG. 10 is a schematic overhead view of an example road network 1000 including three example vehicles 102A-102C en route between respective first geographic locations 120A-120C and respective destinations 124A-124C at second geographic areas. For example, a first vehicle 102A is shown traveling along a planned path 1002A between a first geographic location 120A and a destination 124A. Second and third respective vehicles 102B and 102C each travel along respective planned paths 1002B and 1002C between respective first geographic locations 120B and 120C and respective destinations 124B and 124C. In the example shown, the first planned path 1002A passes an accident zone 1004, which may create a slow traffic condition and unique driving circumstances, such as lane closures and merging traffic. The second planned path 1002B passes through a school zone 1006, which may present unique driving circumstances, such as a school zone speed limit, crosswalks, and someone directing traffic. The third planned path 1002C passes through a construction zone 1008, which may also present unique driving conditions, such as lane changes and someone directing traffic.

The example first vehicle 102A may normally operate according to a first operating mode associated with first operating parameters via the vehicle controller 228 along the road network 1000 according to the first path 1002A. In some examples, the teleoperations system 148 may receive, via the teleoperations receiver 304, via at least one of another entity (e.g., a navigation- or traffic information-related entity) or a vehicle 102 other than the first vehicle 102A, communication signals indicating occurrence of an event associated with a second geographic area located along the first path 1002A. In this example, the event is the example accident zone 1004. Similarly, the teleoperations system 148 may receive, via the teleoperations receiver 304, via at least one of another entity or a vehicle 102 other than the second and third vehicles 102B or 102C, communication signals indicating occurrence of respective events associated with respective second geographic areas located along the second and third paths 1002B and 1002C. In the example shown, the respective events are the school and construction zones 1006 and 1008. A teleoperator 150 in communication with the teleoperations receiver 304 may evaluate data associated with the communication signals and classify the geographic areas associated with the accident zone 1004, the school zone 1006, and/or the construction zone 1008 as corresponding to respective zones in which the vehicle controllers 228 of the respective first, second, and third vehicles 102A, 102B, and 102C operate the respective vehicles according to respective second operating modes associated with second operating parameters, wherein at least one of the second operating parameters differs from a corresponding first operating parameter. For example, the second operating parameters for operating the first vehicle 102A while it is in the vicinity of the accident zone 1004 may include operating at a slower speed, sending signals to the teleoperations system 148, so that the teleoperations system 148 may provide guidance to assist the first vehicle 102A as it passes through the accident zone 1004, for example, so that the first vehicle 102A can change lanes and/or comply with instructions given by someone directing traffic in the vicinity of the accident zone 1004. The second operating parameters for operating the second vehicle 102B while it is in the vicinity of the school zone 1006 may include operating at a slower speed, sending signals to the teleoperations system 148, so that the teleoperations system 148 may provide guidance to assist the second vehicle 102B as it passes through the school zone 1006, for example, so that the second vehicle 102B can stop for crosswalks when people are present at the crosswalks and/or comply with instructions given by someone directing traffic in the school zone 1006. Similarly, the second operating parameters for operating the third vehicle 102C while it is in the vicinity of the construction zone 1008 may include operating at a slower speed and sending signals to the teleoperations system 148, so that the teleoperations system 148 may provide guidance to assist the third vehicle 102C as it passes through the construction zone 1008, for example, so that the third vehicle 102C can change lanes and/or comply with instructions given by someone directing traffic in the vicinity of the construction zone 1008. In some examples, the teleoperations system 148 may send teleoperations signals via the teleoperations transmitter 306, to the vehicles 102A-102C to provide guidance to the respective vehicle controllers 228 of the vehicles 102A-102C to switch from the first operating mode to the second operating mode while operating in the respective second geographic areas. In some examples, the second operating parameters may include one or more of altered performance parameters (e.g., speed, acceleration, braking rates, and steering input rates), altered vehicle operation policies (e.g., safety-related guidelines for controlling the vehicle), altered vehicle operation laws, or vehicle operation regulations.

Although the example events described with respect to FIG. 10 include accident, school, and construction zones, other geographic location-related zones are contemplated. For example, other events may be associated with flood zones, parade zones, special event zones, and/or zones associated with slow traffic, such as areas where vehicles are being driven into bright sunlight or areas where weather conditions such as rain or snow are affecting traffic rates.

As mentioned previously herein, road network data may include data related to a global or local map of an area associated with operation of the vehicle 102. In some examples, the local and/or global map may be configured to be updated by another party using any information relating to any occurrence of an event associated with a geographic area located along a path on which the vehicle 102 travels. For example, a police department may provide information to set policies/regulations for operating in an area, construction workers may provide the scope of a project for incorporation into the local and/or global map, etc.

In some examples, the teleoperations system 148 may be configured to send teleoperations signals providing guidance to all or a subset of the vehicles 102 of the fleet 302. For example, the teleoperations system 148 may be configured to send teleoperations signals to at least a subset of the vehicles 102 providing guidance to switch operation from a first operating mode including first operating parameters to a second operating mode including second operating parameters, at least one of which is different than a corresponding first operating parameter. For example, the second operating parameters may include one or more of second performance parameters, second vehicle operation policies, second vehicle operation laws, and second vehicle operation regulations. In some examples, guidance may include switching from the first operating mode to the second operating mode for a predetermined period of time and thereafter returning to the first operating mode. In some examples, the second operating parameters may include one or more of reducing energy expenditure of the vehicles 102, setting a maximum operating speed, preventing the vehicles 102 from operating bidirectionally, changing a threshold confidence level required for autonomous operation, changing the threshold confidence level required for autonomous operation in a defined geographic area, altering at least one of an object classification model or an object prediction model used by the vehicles, and relaxing vehicle operation policies associated with complying with traffic laws and regulations.

In some examples, the teleoperations signals to each vehicle 102 of the subset may provide guidance to the respective vehicle controllers 228 to avoid a geographic area based at least in part on a presence of an event associated with the road network 104, for example, as previously described. For example, the geographic area may correspond to one or more of a construction zone, a school zone, a flood zone, an accident zone, a parade zone, a special event zone, and a zone associated with a slow traffic condition, and the teleoperations signals may include guidance for operating each of the vehicles 102 of the subset according to the second operating mode that corresponds to at least one of the zones.

The subset of vehicles 102 may include one or more of vehicles 102 carrying at least one occupant, vehicles having no occupants, vehicles including at least one battery having a charge below a threshold level of charge, and vehicles configured to determine a status of conditions associated with the road network 104. For example, if a vehicle 102 is carrying at least one occupant, the vehicle 102 may operate in a mode that favors a short and/or comfortable ride over a path having a shorter distance, which might be preferred for a vehicle having at least one battery below a threshold level of charge. A vehicle 102 being used to determine the status of conditions associated with the road network may be operated according to a mode that favors traveling at a certain speed over selected roads 106 of the road network 104 in order to determine the status of the selected roads.

FIGS. 11-16 are flow diagrams of example processes illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

Figure 11:
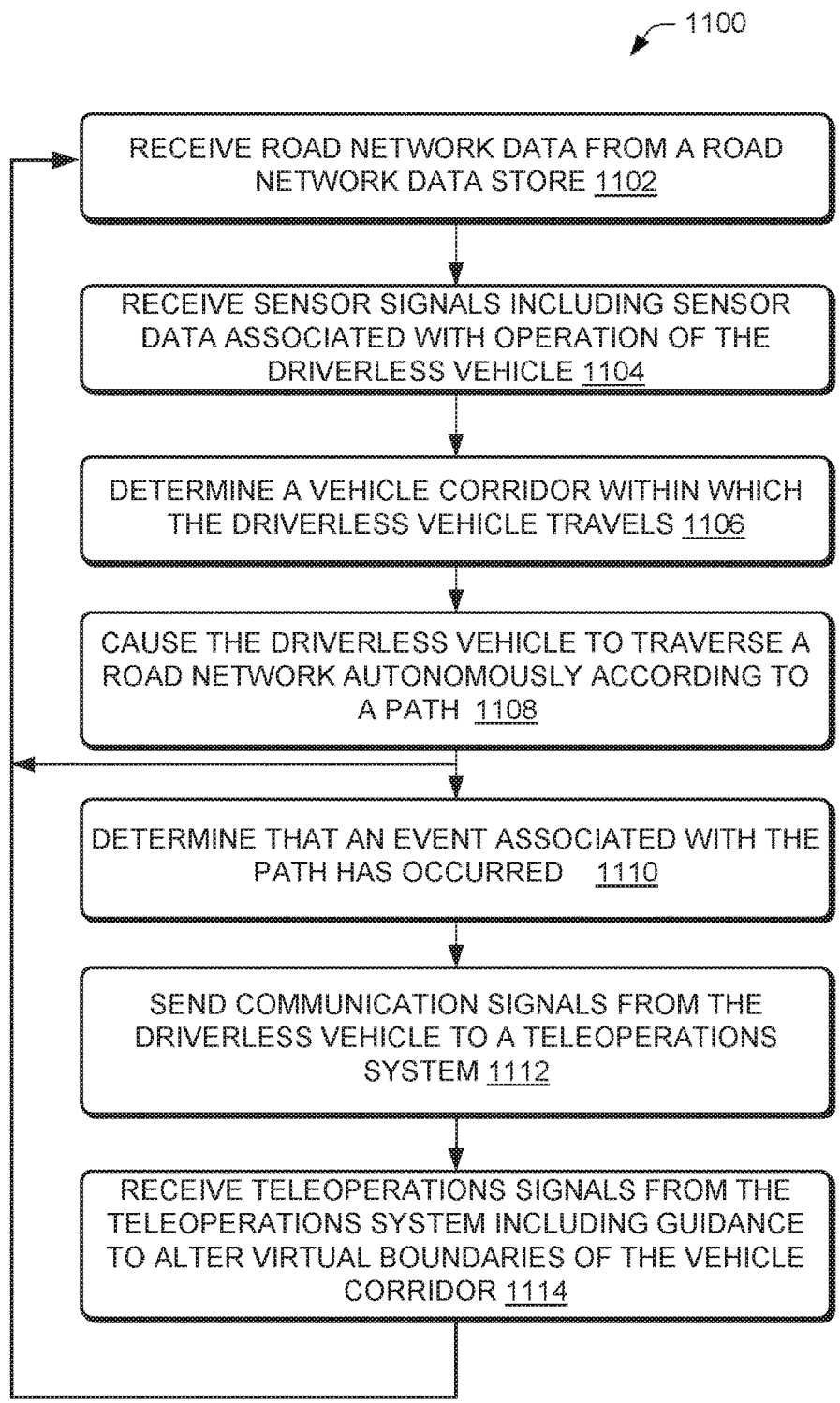
FIG. 11 is a flow diagram of an example process for operating a driverless vehicle in an example driving corridor.

FIG. 11 is a flow diagram of an example process 1100 for operating a driverless vehicle including a vehicle controller. At 1102, the example process 1100 may include receiving road network data from a road network data store. The road network data may be based at least in part on a location of the driverless vehicle. In some examples, this may include global and/or local map data that may be stored and/or updated by the driverless vehicle and/or by the teleoperations system.

At 1104, the example process 1100 may include receiving, at the driverless vehicle, sensor signals including sensor data from one or more sensors associated with the driverless vehicle. In some examples, the sensor data may be related to operation of the driverless vehicle. For example, the sensor data may include sensor signals associated with the environment through which the driverless vehicle is traveling.

At 1106, the example process 1100 may include determining, at the driverless vehicle, a driving corridor within which the driverless vehicle travels according to a trajectory. For example, the driving corridor may include virtual boundaries and/or may be based at least in part on one or more of the sensor data or the road network data.

The example process 1100, at 1108, may further include causing the driverless vehicle to traverse a road network autonomously according to a path from a first geographic location to a second geographic location different than the first geographic location. For example, the driverless vehicle may travel without the assistance of a driver between a starting point, along the path, to the destination. In some examples, following 1108, the process may include returning to 1102 and repeating 1102-1108, for example, until an event associated with the path has been determined, as outlined below.

At 1110, the example process 1100 may include determining that an event associated with the path has occurred. As explained herein, the event may be any condition along the path that may cause the confidence level of the driverless vehicle to drop below a threshold confidence level.

At 1112, the example process 1100 may include sending communication signals from the driverless vehicle to a teleoperations system. For example, the communication signals may include a request for guidance from the teleoperations system and at least one of the sensor data or the road network data.

At 1114, the example process 1100 may further include receiving, at the driverless vehicle, teleoperations signals from the teleoperations system. For example, the teleoperations signals may include guidance to alter the virtual boundaries of the driving corridor, such that the vehicle controller determines a revised trajectory. For example, the vehicle controller may generate a plurality of revised trajectories, for example, concurrently or substantially simultaneously (within technical capabilities), based at least in part on the altered virtual boundaries of the driving corridor. Each of the revised trajectories may be associated with a confidence level, and the example process 1100 may further include selecting a revised trajectory having the highest confidence level from among the plurality of revised trajectories, and the driverless vehicle may be operated according to the selected revised trajectory.

Figure 12:
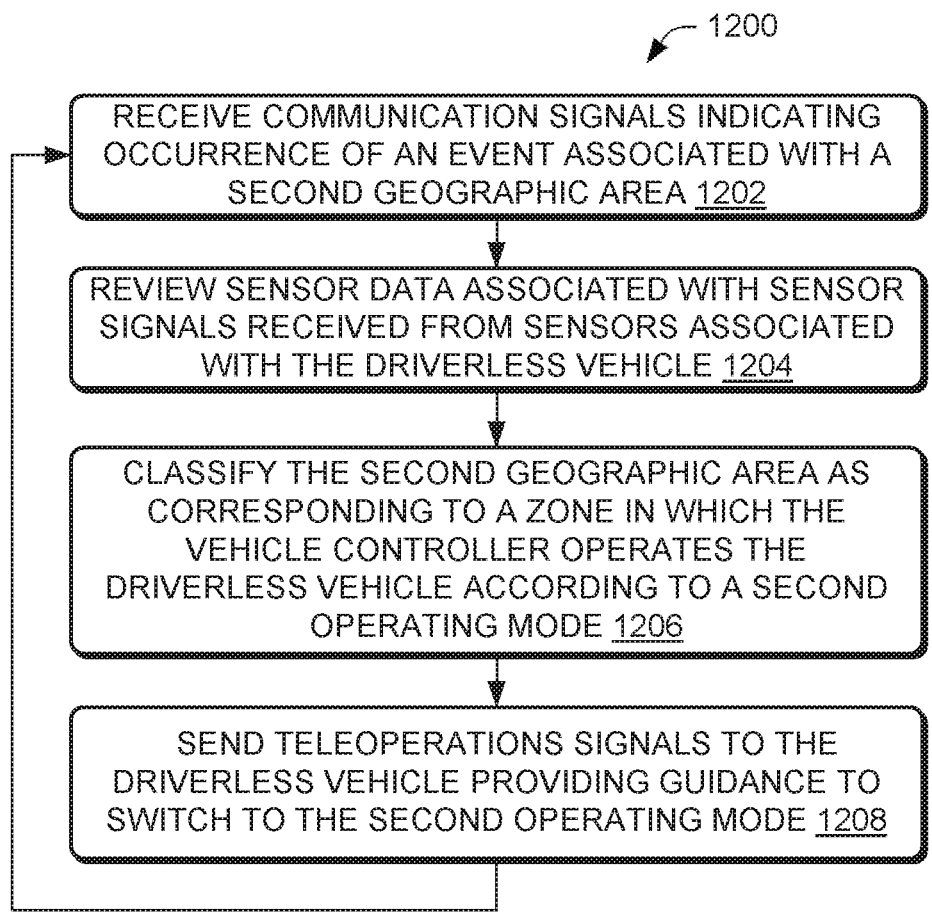
FIG. 12 is a flow diagram of an example process for operating a driverless vehicle according to example first and second operating modes in respective first and second geographic areas.

FIG. 12 is a flow diagram of an example process 1200 for operating a driverless vehicle, with the driverless vehicle including a vehicle controller and autonomously operating according to a first operating mode associated with first operating parameters via the vehicle controller along a road network according to a path from a first geographic location to a destination separated from the first geographic location. At 1202, the example process 1200 may include receiving, via a teleoperations receiver located remotely from the driverless vehicle, via at least one of another entity or the driverless vehicle, communication signals indicating occurrence of an event associated with a second geographic area located along the path.

At 1204, the example process 1200 may include reviewing, by a teleoperator in communication with the teleoperations receiver, sensor data associated with sensor signals received from one more sensors associated with the driverless vehicle. For example, the sensor data may be related to operation of the driverless vehicle.

The example process 1200, at 1206, may include classifying, via the at least one of the other entity or the teleoperator, the second geographic area as corresponding to a zone in which the vehicle controller operates the driverless vehicle according to a second operating mode associated with second operating parameters. In some examples, one or more of the second operating parameters may differ from a corresponding first operating parameter, for example, as discussed herein.

At 1208, the example process 1200 may also include sending teleoperations signals, via a teleoperations transmitter, to the driverless vehicle. The teleoperations signals may provide guidance to the vehicle controller to switch from the first operating mode to the second operating mode while operating in the second geographic area. The second operating parameters may include at least one of second performance parameters, second vehicle operation policies, second vehicle operation laws, or second vehicle operation regulations. The second geographic area may correspond to one or more of a construction zone, a school zone, a flood zone, an accident zone, a parade zone, a special event zone, or a zone associated with a slow traffic condition.

Figure 13:
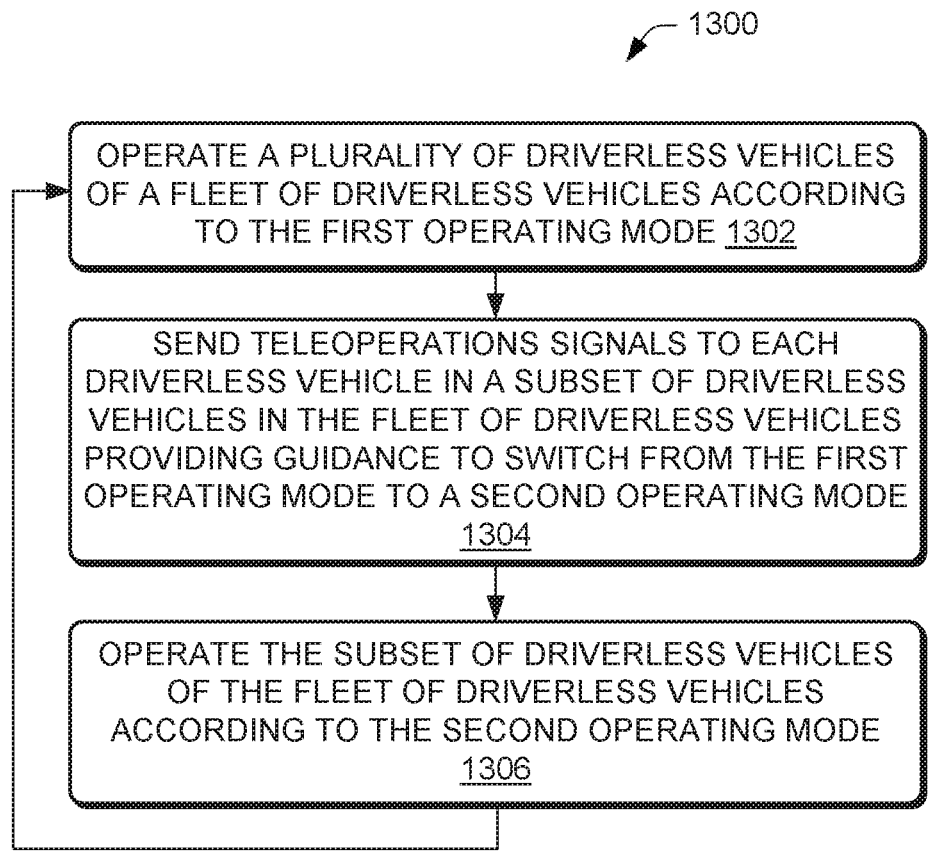
FIG. 13 is a flow diagram of an example process for operating at least a subset of driverless vehicles of a fleet of driverless vehicles according to a second operating mode.

FIG. 13 is a flow diagram of an example process 1300 for altering operation of at least a subset of a plurality of driverless vehicles of a fleet of driverless vehicles. Each driverless vehicle of the subset may include a vehicle controller and may autonomously operate according to a first operating mode associated with first operating parameters via the vehicle controller along a road network according to a respective path from a respective first geographic location to a respective destination separated from the first geographic location. At 1302, the example process 1300 may include operating a plurality of driverless vehicles of a fleet of driverless vehicles according to the first operating mode. The example process 1300, at 1304, may include sending teleoperations signals, via a teleoperations transmitter in communication with a teleoperator and located remotely from the driverless vehicles, to each driverless vehicle of the subset, the teleoperations signals providing guidance to the respective vehicle controllers to switch from the first operating mode to a second operating mode. In some examples, the second operating mode may be associated with second operating parameters including one or more of second performance parameters, second vehicle operation policies, second vehicle operation laws, and second vehicle operation regulations, and at least one of the second operating parameters may differ from a corresponding first operating parameter. At 1306, the example process 1300 may include operating the subset of driverless vehicles of the fleet of driverless vehicles according to the second operating mode.

Figure 14:
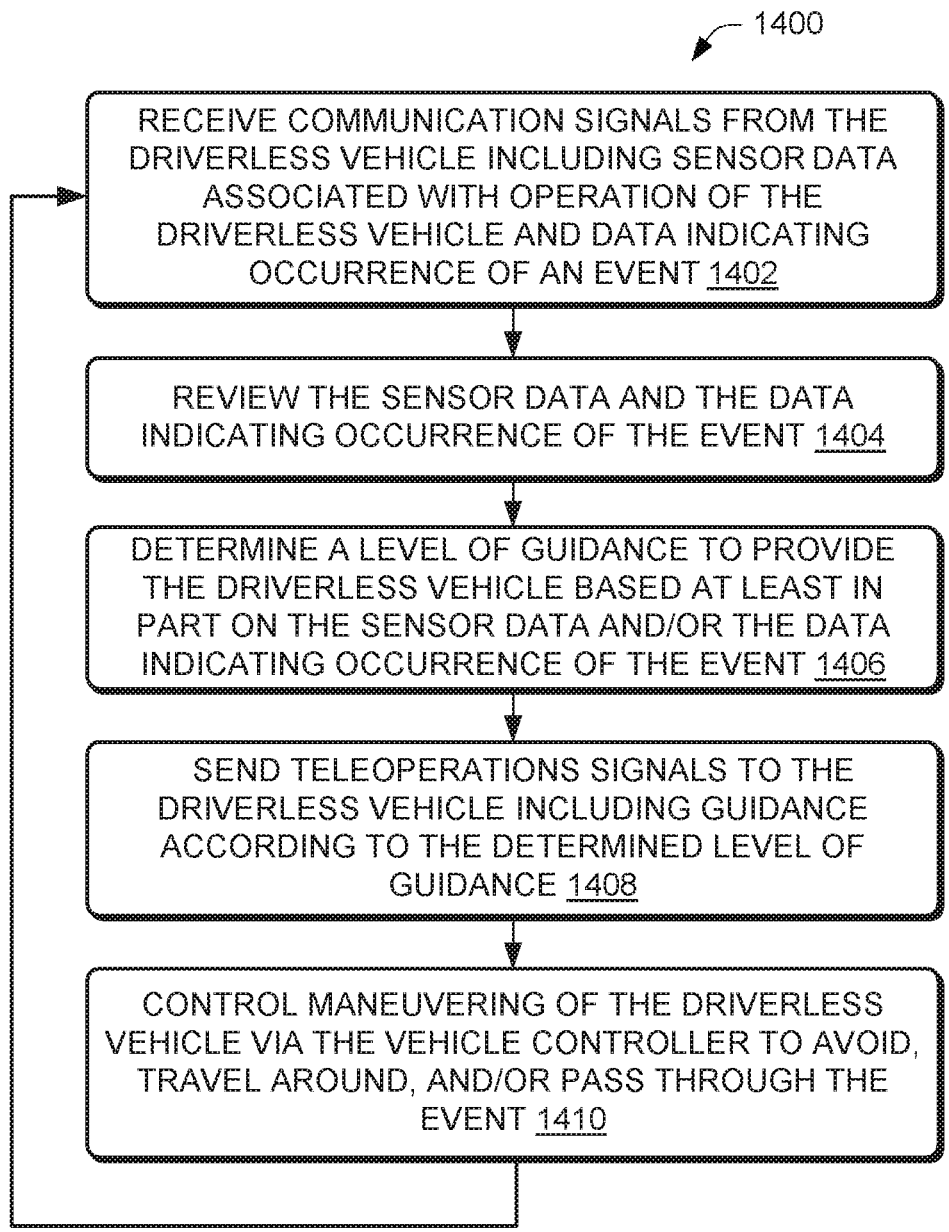
FIG. 14 is a flow diagram of an example process for operating a driverless vehicle according to a determined level of guidance.

FIG. 14 is a flow diagram for an example process 1400 for operating a driverless vehicle, with the driverless vehicle including a vehicle controller and autonomously operating via the vehicle controller along a road network according to a path from a first geographic location to a destination separated from the first geographic location. At 1402, the example process 1400 may include receiving, via a teleoperations receiver located remotely from the driverless vehicle, communication signals from the driverless vehicle. The communication signals may include sensor data from one or more sensors associated with operation of the driverless vehicle. The communication signals may also include data indicating occurrence of an event associated with the path, wherein the data indicating occurrence of the event includes data indicating a confidence level associated with the path is less than a threshold confidence level.

At 1404, the example process 1400 may also include reviewing, via a teleoperator in communication with the teleoperations receiver, the sensor data and the data indicating occurrence of the event. At 1406, the example process 1400 may include determining, via the teleoperator, a level of guidance to provide the driverless vehicle based at least in part on one or more of the sensor data and the data indicating occurrence of the event. In some examples, the level of guidance may relate to whether the teleoperator provides instructions to the driverless vehicle, collaborates with the driverless vehicle, for example, trading information and/or proposed actions, or confirms information received from the driverless vehicle and/or actions proposed by the driverless vehicle.

At 1408, the example process 1400 may further include sending teleoperations signals, via a teleoperations transmitter, to the driverless vehicle. The teleoperations signals may include guidance to operate the driverless vehicle according to the determined level of guidance, so that the vehicle controller maneuvers the driverless vehicle to at least one of avoid the event, travel around the event, or pass through the event. At 1410, the example process 1400 may also include controlling the maneuvering of the driverless vehicle via the vehicle controller to avoid, travel around, and/or pass through the event.

In some examples, the event may include an object impeding completion of a portion of the path, and sending the teleoperations signals may include sending teleoperations signals including a proposed trajectory for use by the vehicle controller to avoid the object to permit the vehicle controller to maneuver the driverless vehicle past the object. In some examples, the teleoperations signals may include guidance in the form of teleoperations signals that provide a proposed reclassification of the object and/or that confirm a classification of the object. Such reclassification may result in a different predicted trajectory of the object, which may increase the confidence level to a level at which the driverless vehicle can continue along its original drive line and/or trajectory. In some examples, the communication signals from the driverless vehicle may include data related to classification of the object, and the teleoperations signals may propose ignoring the object to permit the vehicle controller to maneuver the driverless vehicle past the object. For example, if the object is trash or a small stick that would not pose a safety or operational problem, the driverless vehicle may simply not attempt to avoid the object. In some examples, the communication signals from the driverless vehicle may include a proposed trajectory for passing the object and completing the portion of the path. In such examples, the teleoperations signals may confirm or decline the proposed trajectory, and thus, the teleoperations system may merely authorize the trajectory proposed by the driverless vehicle. In some examples, when the teleoperations signals decline the proposed trajectory, the teleoperations signals may also provide an alternative proposed trajectory for the vehicle controller to maneuver the driverless vehicle past the object.

In some examples, the communication signals from the driverless vehicle may include a proposal to sound an audible warning, a proposal to activate lights to provide a visual warning, and/or a proposal to move the driverless vehicle slowly forward. In such examples, the teleoperations signals may accept or decline at least one of the proposals. For example, the object may be an unattended animal within the driving corridor, which will cause the driverless vehicle slow or stop. The driverless vehicle may use an audible warning and/or activate lights to encourage the animal to exit the road, and/or the vehicle may inch forward slowly to encourage the animal to exit the road.

In some examples, the event may include an operational rule preventing completion of a portion of the path, and the teleoperations signals may propose a modification to the operational rule to permit the vehicle controller to maneuver the driverless vehicle past the event. For example, the road may include a shoulder and use of the shoulder would enable the driverless vehicle to travel past the object. However, operational rules of the driverless vehicle may prevent the driverless from using the shoulder. In some such situations, the teleoperations signals may propose using the shoulder.

In some examples, the event may be the driverless vehicle lacking information sufficient to complete a portion of the path, and the teleoperations signals may provide information sufficient to permit the vehicle controller to maneuver the driverless vehicle past the event. For example, the driverless vehicle may not be able to identify and/or classify an object, and teleoperations signals may identify or classify the object so that the driverless vehicle is able to take appropriate action. Alternatively, the teleoperations signals may provide a proposed trajectory for the vehicle controller to maneuver the driverless vehicle past the event.

In some examples, the communication signals from the driverless vehicle may include a predicted trajectory of an object into a path of the driverless vehicle. In some such circumstances, the teleoperations signals may alter the predicted trajectory, so that the vehicle controller maneuvers the driverless vehicle past the object.

Figure 15:
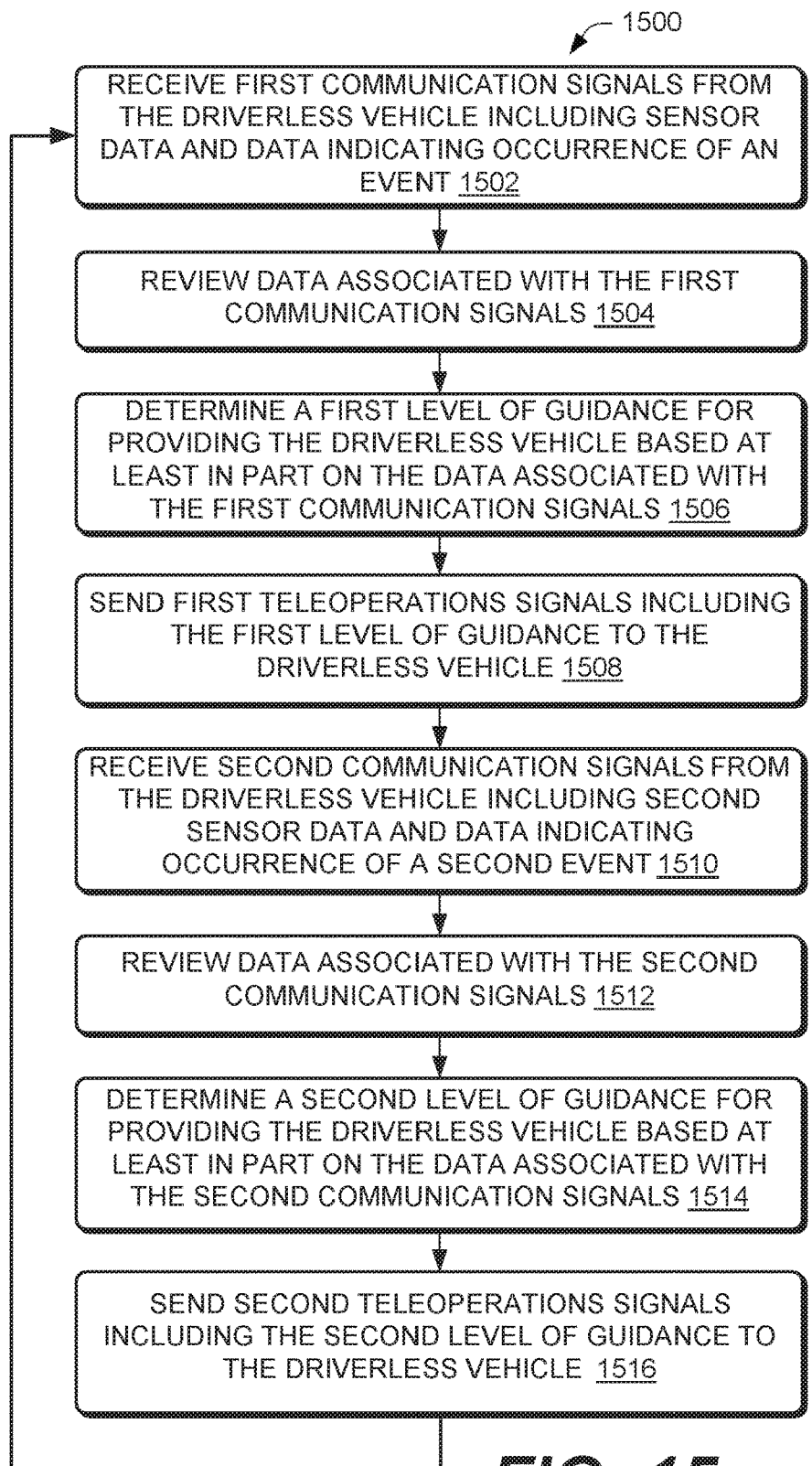
FIG. 15 is a flow diagram of an example process for operating a driverless vehicle according to changing levels of guidance provided by a teleoperator.

FIG. 15 is a flow diagram of an example process 1500 for operating a driverless vehicle. The driverless vehicle may include a vehicle controller and may autonomously operate via the vehicle controller along a road network according to a path from a first geographic location to a destination separated from the first geographic location. At 1502, the example process 1500 may include receiving, via a teleoperations receiver located remotely from the driverless vehicle, first communication signals from the driverless vehicle. The first communication signals may include first sensor data related to operation of the driverless vehicle from one or more sensors associated with the driverless vehicle. The first communication signals may also include data indicating occurrence of a first event associated with the path. The first event may include first characteristics including at least one characteristic not previously encountered by the driverless vehicle or at least one characteristic previously encountered by the driverless vehicle fewer than a threshold number of occurrences. The first communication signals may also include a request for guidance to pass the event and continue along the path.

At 1504, the example process 1500 may also include reviewing, via a teleoperator in communication with the teleoperations receiver, data associated with the first communication signals received from the driverless vehicle. For example, the teleoperator may use a teleoperations interface to facilitate this review.

At 1506, the example process 1500 may also include determining, via the teleoperator, a first level of guidance for providing the driverless vehicle based at least in part on the data associated with the first communication signals. For example, the first level of guidance may relate to whether the teleoperator provides instructions to the driverless vehicle, collaborates with the driverless vehicle, for example, trading information and/or proposed actions, or confirms information received from the driverless vehicle and/or actions proposed by the driverless vehicle.

At 1508, the example process 1500 may include sending first teleoperations signals, via a teleoperations transmitter, to the driverless vehicle. The first teleoperations signals may include the first level of guidance, so that the vehicle controller maneuvers the driverless vehicle to pass the first event and continue along the path according to the first level of guidance.

At 1510, the example process 1500 may further include receiving, via the teleoperations receiver, second communication signals from the driverless vehicle. The second communication signals may include second sensor data related to operation of the driverless vehicle from one or more sensors associated with the driverless vehicle. The second communication signals may also include data indicating occurrence of a second event associated with the path. The second event may include second characteristics, wherein the second characteristics include at least one second characteristic in common with at least one of the first characteristics. The second communication signals may also include a request for at least one of information related to the second event or a proposed action for passing the second event and continuing along the path.

At 1512, the example process 1500 may also include reviewing, via a teleoperator in communication with the teleoperations receiver data associated with the second communication signals received from the driverless vehicle. At 1514, the example process 1500 may also include determining, via the teleoperator, a second level of guidance for providing the driverless vehicle based at least in part on the data associated with the second communication signals.

At 1516, the example process 1500 may also include sending second teleoperations signals, via the teleoperations transmitter, to the driverless vehicle. In some examples, the second teleoperations signals may include the second level of guidance, and the second level of guidance may include at least one of the information related to the second event or the proposed second action, so that the vehicle controller maneuvers the driverless vehicle to pass the second event and continue along the path based at least in part on at least one of the information related to the second event or the proposed second action.

In some examples of the process 1500, the process may further include receiving, in a machine learning engine including an event response model, data associated with the first communication signals and/or the data associated with the second communication signals. In some such examples, the event response model may be updated based at least in part on the data associated with the first communication signals, the data associated with the second communication signals, the first level of guidance, and/or the second level of guidance. In this example manner, the process 1500 may improve over time with the updates. For example, the process 1500 may also include transforming the first level of guidance into the second level of guidance based at least in part on the updated event response model.

Figure 16:
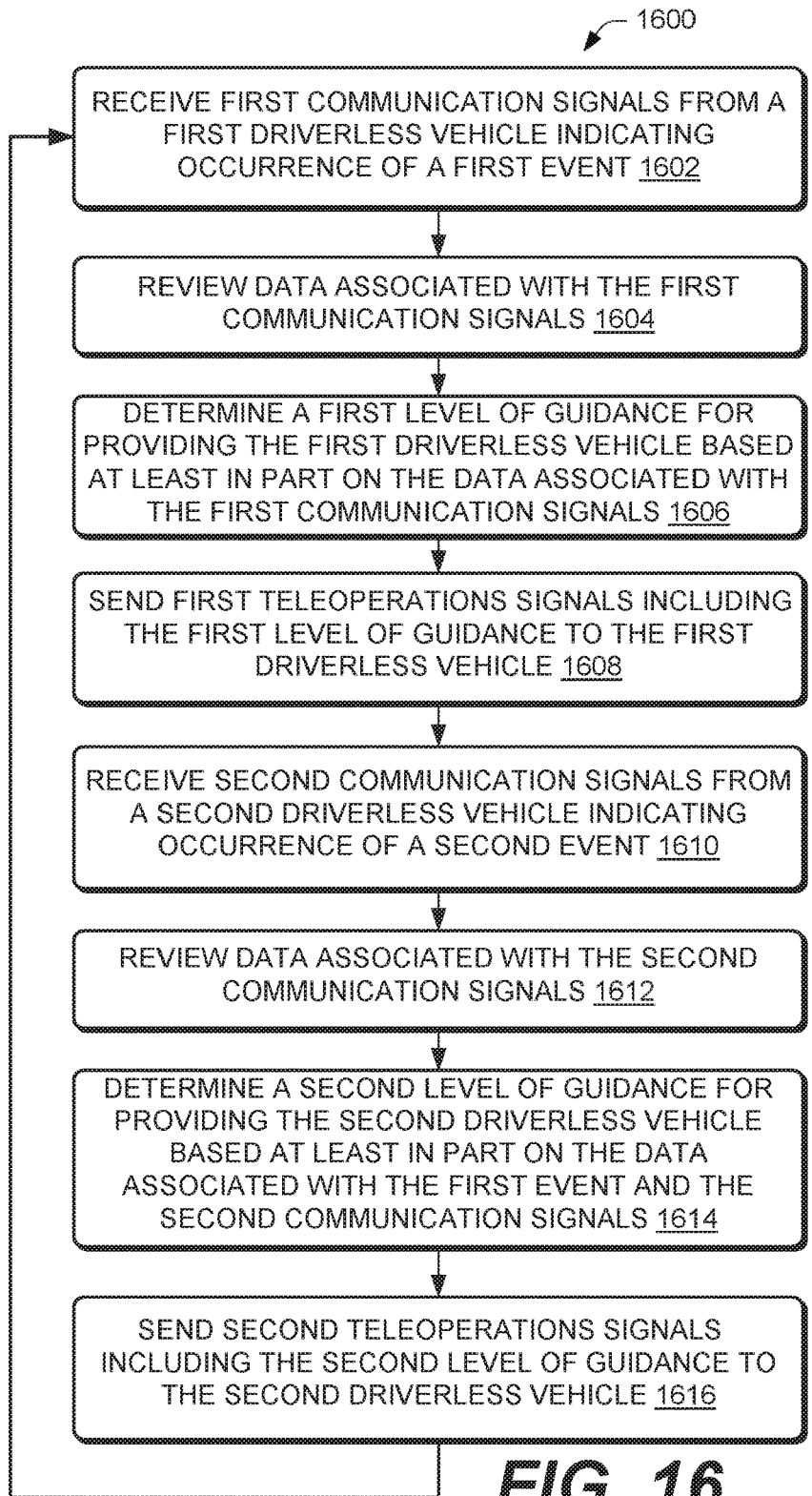
FIG. 16 is a flow diagram of an example process for operating a plurality of driverless vehicle according to changing levels of guidance provided by a teleoperator.

FIG. 16 is a flow diagram of an example process 1600 for operating a plurality of driverless vehicles. The driverless vehicles may each include a vehicle controller and may autonomously operate via the vehicle controller along a road network according to a path from a first geographic location to a destination separated from the first geographic location.

At 1602, the example process 1600 may include receiving, via a teleoperations receiver located remotely from a first one of the plurality of driverless vehicles, first communication signals from the first driverless vehicle indicating occurrence of a first event associated with the road network along a path associated with the first driverless vehicle. The first event may include first characteristics, and the first communication signals may include a request for guidance to pass the event and continue along the path.

At 1604, the example process 1600 may include reviewing, via a first teleoperator in communication with the teleoperations receiver, data associated with the first communication signals received from the first driverless vehicle. At 1606, the example process 1600 may also include determining, via the first teleoperator, a first level of guidance for providing the first driverless vehicle based at least in part on at least one of the data associated with the first communication signals, and at 1608, sending first teleoperations signals, via a teleoperations transmitter, to the first driverless vehicle, wherein the first teleoperations signals include the first level of guidance.

At 1610, the example process 1600 may also include receiving, via a teleoperations receiver, second communication signals from a second driverless vehicle of the plurality of driverless vehicles indicating occurrence of a second event associated with the road network along a path associated with the second driverless vehicle. The second event may include second characteristics, wherein the second characteristics include at least one second characteristic in common with at least one of the first characteristics, and the second communication signals may include a request for information related to the second event and/or a proposed action for passing the second event and continuing along the path.

At 1612, the example process 1600 may further include reviewing, via a teleoperator in communication with a teleoperations receiver, data associated with the second communication signals received from the second driverless vehicle, and at 1614, determining, via the teleoperator, a second level of guidance for providing the second driverless vehicle based at least in part on data associated with the first event and the data associated with the second communication signals.

At 1616, the example process 1600 may also include sending second teleoperations signals, via the teleoperations transmitter, to the second driverless vehicle. In some examples, the second teleoperations signals may include the second level of guidance, wherein the second level of guidance includes the information related to the second event and/or the proposed second action, so that the vehicle controller maneuvers the second driverless vehicle to pass the second event and continue along the path based at least in part on at least one of the information related to the second event or the proposed second action.

It should be appreciated that the subject matter presented herein may be implemented as a computer process, a computer-controlled apparatus, a computing system, or an article of manufacture, such as a computer-readable storage medium. While the subject matter described herein is presented in the general context of modules that may include hardware and/or software layers that execute on one or more computing devices, those skilled in the art will recognize that other implementations may be performed in combination with other types of program modules. Generally, software modules include routines, programs, components, data structures, and other types of structures that perform particular tasks or implement particular abstract data types. In some examples, any number of modules (hardware and/or software) may be employed, and techniques described herein as employed by one or more modules may be employed by a greater or lesser number of modules.

Those skilled in the art will also appreciate that aspects of the subject matter described herein may be practiced on or in conjunction with other computer system configurations beyond those described herein, including multiprocessor systems, microprocessor-based or programmable consumer electronics, minicomputers, mainframe computers, handheld computers, mobile telephone devices, tablet computing devices, special-purposed hardware devices, network appliances, and the like.

Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and media are disclosed as example forms of implementing the subject matter recited in the claims.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the examples and applications illustrated and described, and without departing from the spirit and scope of the present invention, which is set forth in the following claims.

What is claimed is:

1. A method for operating a driverless vehicle comprising a vehicle controller, the method comprising:
    receiving, at the driverless vehicle, sensor signals comprising sensor data from one or more sensors associated with the driverless vehicle, the sensor data related to operation of the driverless vehicle;
    receiving road network data from a road network data store, the road network data being based at least in part on a location of the driverless vehicle;
    determining, at the driverless vehicle, a driving corridor within which the driverless vehicle travels according to a trajectory, the driving corridor comprising virtual boundaries and being based at least in part on at least one of the sensor data or the road network data;
    causing the driverless vehicle to traverse a road network autonomously according to a path from a first geographic location to a second geographic location different than the first geographic location;
    determining that an event associated with the path has occurred;
    based at least in part on determining that the event has occurred, sending communication signals from the driverless vehicle to a teleoperations system, the communication signals comprising a request for guidance from the teleoperations system and one or more of a portion of sensor data and the road network data;
    receiving, at the driverless vehicle, teleoperations signals from the teleoperations system; and
    determining, by the vehicle controller, a revised trajectory based at least in part on the teleoperations signals.

2. The method of claim 1, wherein the teleoperations signals comprise guidance to alter the virtual boundaries of the driving corridor to create altered virtual boundaries, and wherein causing the driverless vehicle to traverse the road network autonomously comprises generating, at the driverless vehicle, a plurality of revised trajectories concurrently based at least in part on the altered virtual boundaries of the driving corridor, each of the revised trajectories being associated with a confidence level, and the method further comprising:
    selecting a revised trajectory having a highest confidence level from among the plurality of revised trajectories; and
    operating the driverless vehicle according to the selected revised trajectory.

3. The method of claim 1, wherein the event comprises at least one of an activity associated with a portion of the path, an object at least partially within the driving corridor, an animal at least partially within the driving corridor or moving with a trajectory toward the driving corridor, or a person at least partially within the driving corridor or moving toward the driving corridor.

4. The method of claim 1, wherein determining that an event has occurred comprises determining that a confidence level associated with the trajectory is less than a threshold confidence level, and wherein the confidence level is based at least in part on a probability that the driverless vehicle can autonomously traverse a portion of the path.

5. The method of claim 1, wherein receiving the teleoperations signals at the driverless vehicle comprises receiving guidance for the driverless vehicle to at least one of move slowly forward, sound an audible warning, or activate lighting to provide a visual warning.

6. The method of claim 5, wherein the guidance comprises an alteration of the virtual boundaries, and the alteration is configured to avoid the event, travel around the event, or pass through the event.

7. The method of claim 1, wherein the trajectory is selected from a plurality of alternate trajectories generated concurrently at the driverless vehicle based at least in part on the driving corridor, each of the alternate trajectories being associated with a confidence level, and wherein the trajectory has a highest confidence level of the alternate trajectories.

8. The method of claim 1, wherein the event is indicative of a predicted movement of an object into the driving corridor, and receiving the teleoperations signals at the driverless vehicle comprises receiving teleoperations signals providing guidance to alter the predicted movement of the object.

9. The method of claim 1, wherein determining that an event has occurred comprises determining at least one of a classification of an object present in the driving corridor or predicting movement of an object having a trajectory toward the driving corridor, and
    wherein receiving the teleoperations signals at the driverless vehicle comprises receiving guidance to at least one of alter the classification of the object or ignore the object.

10. A teleoperations system for assisting with operating a driverless vehicle, the driverless vehicle comprising a vehicle controller and configured to autonomously operate according to a first operating mode associated with first operating parameters via the vehicle controller along a road network according to a path from a first geographic location to a destination separated from the first geographic location, the teleoperations system comprising:
    a teleoperations receiver configured to receive sensor data associated with sensor signals received from one more sensors associated with the driverless vehicle, the sensor data being related to operation of the driverless vehicle;
    a teleoperations interface configured to facilitate:

determining that the driverless vehicle is in a second geographic area based at least in part on the sensor data associated with sensor signals received from one or more sensors associated with the driverless vehicle; and classifying the second geographic area as corresponding to a zone in which the vehicle controller is to operate the driverless vehicle according to a second operating mode associated with second operating parameters, wherein at least one of the second operating parameters differs from a corresponding first operating parameter; and a teleoperations transmitter configured to send teleoperations signals to the driverless vehicle, the teleoperations signals providing guidance to the vehicle controller to switch from the first operating mode to the second operating mode while operating in the second geographic area.

11. The teleoperations system of claim 10, wherein the second operating parameters comprise at least one of second performance parameters, second vehicle operation policies, second vehicle operation laws, or second vehicle operation regulations.

12. The teleoperations system of claim 10, wherein the second geographic area corresponds to at least one of a construction zone, a school zone, a flood zone, an accident zone, a parade zone, a special event zone, or a zone associated with a slow traffic condition.

13. The teleoperations system of claim 10, wherein the vehicle controller is configured to cause the driverless vehicle to operate within virtual boundaries of a driving corridor having a corridor width and a corridor length extending in a direction of travel of the driverless vehicle, and wherein the teleoperations signals providing guidance cause the vehicle controller to alter the virtual boundaries, so that the vehicle controller determines a revised trajectory to at least one of travel around the second geographic area or pass through the second geographic area.

14. The teleoperations system of claim 10, wherein the sensor signals comprise sensor signals indicative of a classification of an object present in an environment proximate to the driverless vehicle as belonging to a set of objects corresponding to a zone, and the teleoperations signals comprise guidance to at least one of alter the classification of the object or ignore the object.

15. The teleoperations system of claim 10, wherein the teleoperations signals comprise guidance to operate driverless vehicle in the second geographic area according the second operating mode.

16. A non-transitory computer-readable storage medium having computer-executable instructions stored thereupon which, when executed by a computer, cause the computer to:

assist with operating at least a subset of a plurality of driverless vehicles of a fleet of driverless vehicles, each driverless vehicle of the subset comprising a vehicle controller and autonomously operating according to a first operating mode associated with first operating parameters via the vehicle controller along a road network according to a respective path from a respective first geographic location to a respective destination separated from the first geographic location, wherein assisting with operating the at least a subset of the plurality of driverless vehicles comprises causes the computer to:

send teleoperations signals to each driverless vehicle of the subset, the teleoperations signals providing guidance to the respective vehicle controllers to switch from the first operating mode to a second operating mode, wherein the second operating mode is associated with second operating parameters comprising at least one of second performance parameters, second vehicle operation policies, second vehicle operation laws, or second vehicle operation regulations, and wherein at least one of the second operating parameters differs from a corresponding first operating parameter.

17. The non-transitory computer-readable storage medium of claim 16, wherein sending the teleoperations signals to each driverless vehicle of the subset comprises providing guidance to the respective vehicle controllers to avoid a second geographic area based at least in part on a presence of an event associated with the road network, and wherein the second geographic area corresponds to at least one of a construction zone, a school zone, a flood zone, an accident zone, a parade zone, a special event zone, or a zone associated with a slow traffic condition, and operating each of the driverless vehicles of the subset via the respective vehicle controllers comprises operating each of the driverless vehicles according to a second operating mode that corresponds to at least one of the zones.

18. The non-transitory computer-readable storage medium of claim 16, wherein the subset of driverless vehicles comprises at least one of:
driverless vehicles carrying at least one occupant;
driverless vehicles having no occupants;
driverless vehicles comprising at least one battery having a charge below a threshold level of charge; or
driverless vehicles configured to determine a status of conditions associated with the road network.

19. The non-transitory computer-readable storage medium of claim 16, wherein the second operating parameters comprise at least one of reducing energy expenditure of the driverless vehicles, setting a maximum operating speed, preventing the driverless vehicles from operating bidirectionally, changing a threshold confidence level required for autonomous operation, changing the threshold confidence level required for autonomous operation in a second geographic area, altering at least one of an object classification model or an object prediction model used by the driverless vehicles, or relaxing vehicle operation policies associated with complying with traffic laws and regulations.

20. The non-transitory computer-readable storage medium of claim 16, wherein autonomously operating according to the first operating mode associated with first operating parameters via the vehicle controller comprises autonomously driving the driverless vehicle within a driving corridor along the path, the driving corridor comprising virtual boundaries comprising a variable driving corridor width and a variable driving corridor length extending in a direction of travel of the driverless vehicle, and sending teleoperations signals providing guidance to the vehicle controller to switch from the first operating mode to the second operating mode comprises sending teleoperations signals comprising guidance to alter the virtual boundaries of the driving corridor so that the vehicle controller determines a revised trajectory.

* * * * *